US011613290B2

(12) United States Patent
Greenup

(10) Patent No.: US 11,613,290 B2
(45) Date of Patent: Mar. 28, 2023

(54) HAND TRUCK SYSTEM

(71) Applicant: Peter Michael Greenup, Portland, OR (US)

(72) Inventor: Peter Michael Greenup, Portland, OR (US)

( * ) Notice: Subject to any disclaimer, the term of this patent is extended or adjusted under 35 U.S.C. 154(b) by 956 days.

(21) Appl. No.: 16/388,773

(22) Filed: Apr. 18, 2019

(65) Prior Publication Data

US 2019/0322302 A1 Oct. 24, 2019

Related U.S. Application Data

(60) Provisional application No. 62/660,179, filed on Apr. 19, 2018.

(51) Int. Cl.
*B62B 5/02* (2006.01)
*B62B 3/02* (2006.01)

(52) U.S. Cl.
CPC .............. *B62B 5/026* (2013.01); *B62B 3/022* (2013.01); *B62B 2205/26* (2013.01); *B62B 2301/04* (2013.01); *B62B 2301/25* (2013.01)

(58) Field of Classification Search
CPC ........... B62B 1/042; B62B 5/02; B62B 5/026; B62B 5/028
See application file for complete search history.

(56) References Cited

U.S. PATENT DOCUMENTS

| | | | | |
|---|---|---|---|---|
| 2,706,640 A * | 4/1955 | Marshall | ................. | B62B 5/026 280/5.3 |
| 2,736,564 A * | 2/1956 | Loam | ...................... | B62B 5/026 280/5.3 |
| 2,747,883 A * | 5/1956 | Frost | ....................... | B62B 5/026 280/47.27 |
| 3,058,754 A * | 10/1962 | Whitaker | ................ | B62B 5/026 280/5.26 |
| 3,326,563 A * | 6/1967 | Whitaker | ................ | B62B 5/026 280/5.26 |
| 3,346,269 A * | 10/1967 | Soto | ........................ | B62B 5/026 280/5.26 |
| 3,450,219 A * | 6/1969 | Fleming | ................. | B62D 51/04 180/8.2 |
| 3,515,401 A * | 6/1970 | Gross | ...................... | B62B 5/026 180/8.2 |
| 4,142,732 A * | 3/1979 | Boyd | ...................... | B62B 5/026 188/77 R |
| 4,264,082 A * | 4/1981 | Fouchey, Jr. | ........... | B62B 5/026 188/31 |
| 4,312,417 A * | 1/1982 | Dalton | .................... | B62B 5/026 180/8.2 |
| 4,421,189 A * | 12/1983 | Watkins | ................. | A61G 5/065 280/5.2 |
| 4,457,526 A * | 7/1984 | Persson | ................... | B62B 5/026 305/1 |
| 4,505,495 A * | 3/1985 | Foss | ......................... | B62B 3/02 16/113.1 |

(Continued)

*Primary Examiner* — Jeffrey J Restifo

(74) *Attorney, Agent, or Firm* — Klarquist Sparkman, LLP

(57) ABSTRACT

A hand-truck frame system includes a main frame, a bed frame, and pair of multi-wheel assembles coupled to the main frame and rotatable to provide improved climbing capabilities over certain terrain, such as stairs. The multi-wheel assemblies can have four wheels radially mounted about respective hubs of the first and second multi-wheel assemblies.

20 Claims, 14 Drawing Sheets

(56) References Cited

U.S. PATENT DOCUMENTS

| | | | | |
|---|---|---|---|---|
| 4,687,213 A * | 8/1987 | Ridderstolpe | B62D 57/022 | 280/5.26 |
| 4,887,837 A * | 12/1989 | Bonewicz, Jr. | B62B 1/12 | 280/654 |
| 4,921,270 A * | 5/1990 | Schoberg | B62B 1/002 | 414/490 |
| 4,960,179 A * | 10/1990 | Leach | B62B 5/026 | 280/47.27 |
| 5,273,296 A * | 12/1993 | Lepek | B62B 5/026 | 280/5.2 |
| 5,326,116 A * | 7/1994 | Flax | B62B 3/02 | D34/17 |
| 5,797,617 A * | 8/1998 | Lin | B62B 1/125 | 280/37 |
| 6,431,664 B1 * | 8/2002 | Sawada | B62B 5/026 | 305/1 |
| 6,637,761 B1 * | 10/2003 | Boettcher | B62B 1/268 | 414/490 |
| 7,055,848 B1 * | 6/2006 | James | B62K 27/02 | 280/401 |
| 7,516,502 B1 * | 4/2009 | Larson | B62B 5/026 | 280/47.131 |
| 7,516,503 B1 * | 4/2009 | Larson | A61G 1/0218 | 5/651 |
| 7,631,380 B1 * | 12/2009 | Larson | A61G 1/0231 | 280/47.131 |
| 10,131,374 B1 * | 11/2018 | Khodor | B62B 5/065 | |
| 10,392,041 B1 * | 8/2019 | Khodor | B62B 1/12 | |
| D915,717 S * | 4/2021 | Cai | D34/17 | |
| 11,124,216 B1 * | 9/2021 | Wein | B62B 9/08 | |
| 2003/0209884 A1 * | 11/2003 | Joie | B62B 1/12 | 280/651 |
| 2005/0087940 A1 * | 4/2005 | Ally | B62B 5/026 | 280/5.26 |
| 2006/0145045 A1 * | 7/2006 | Chisholm | B25H 1/04 | 248/439 |
| 2007/0222165 A1 * | 9/2007 | Hope | B62B 5/026 | 280/5.26 |
| 2008/0018166 A1 * | 1/2008 | Chang | B62B 5/026 | 301/5.23 |
| 2008/0164665 A1 * | 7/2008 | Chang | B62B 5/026 | 280/5.28 |
| 2008/0238003 A1 * | 10/2008 | Burkard | B62B 1/10 | 280/5.32 |
| 2009/0133517 A1 * | 5/2009 | Kamara | B62B 5/0069 | 74/10.29 |
| 2009/0309319 A1 * | 12/2009 | Kamara | B62B 5/026 | 280/5.26 |
| 2010/0026080 A1 * | 2/2010 | Colchiesqui | B62B 5/026 | 301/5.23 |
| 2010/0032911 A1 * | 2/2010 | Sarokhan | B62B 5/026 | 280/5.28 |
| 2010/0294575 A1 * | 11/2010 | Martel | B62B 1/10 | 180/8.2 |
| 2012/0292889 A1 * | 11/2012 | Khodor | B62B 5/026 | 280/651 |
| 2013/0127233 A1 * | 5/2013 | Wollborg | B62B 5/026 | 301/5.1 |
| 2013/0184917 A1 * | 7/2013 | Sarokhan | B62B 5/026 | 180/7.1 |
| 2013/0186698 A1 * | 7/2013 | Sarokhan | B62B 5/026 | 180/7.1 |
| 2013/0231814 A1 * | 9/2013 | Sarokhan | B25J 9/1694 | 180/7.1 |
| 2013/0274973 A1 * | 10/2013 | Kamara | B62B 5/0026 | 180/7.1 |
| 2015/0166088 A1 * | 6/2015 | Khodor | B62B 1/042 | 280/639 |
| 2019/0039635 A1 * | 2/2019 | Khubani | B62B 1/008 | |
| 2019/0322302 A1 * | 10/2019 | Greenup | B62B 3/02 | |
| 2020/0198681 A1 * | 6/2020 | Jian | B62B 5/02 | |
| 2021/0229726 A1 * | 7/2021 | Kemp | B62B 5/0046 | |
| 2022/0017132 A1 * | 1/2022 | Rowland | B62B 5/028 | |
| 2022/0135102 A1 * | 5/2022 | Fujihara | B62B 5/04 | 180/209 |

* cited by examiner

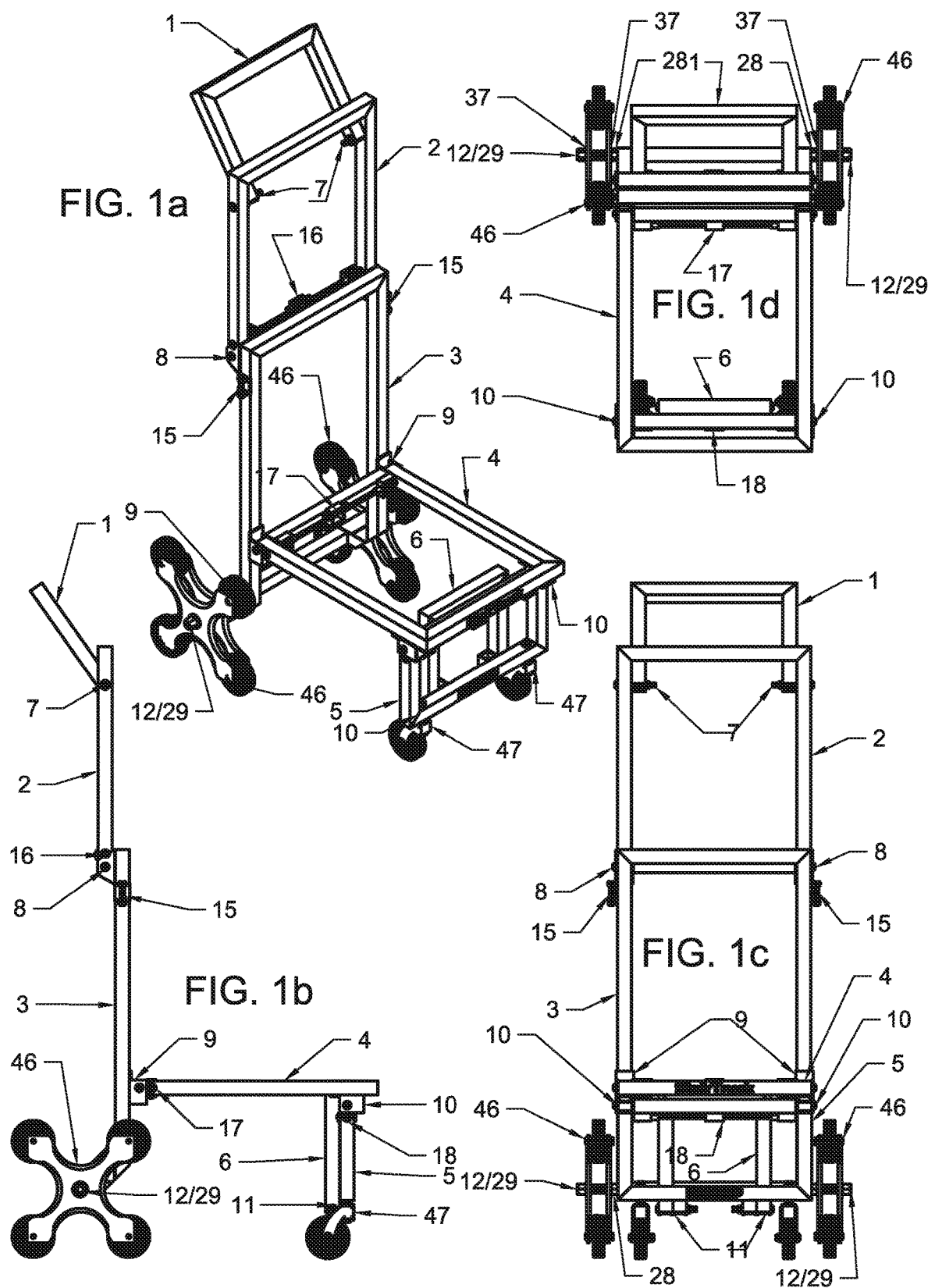

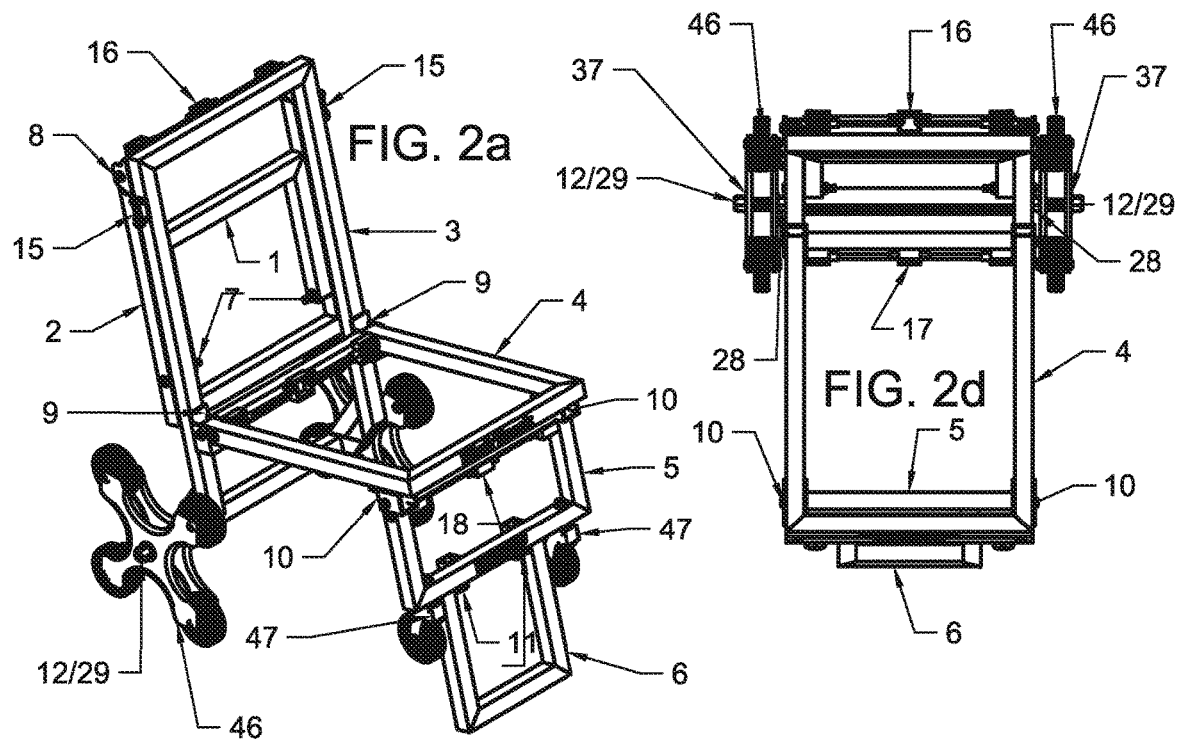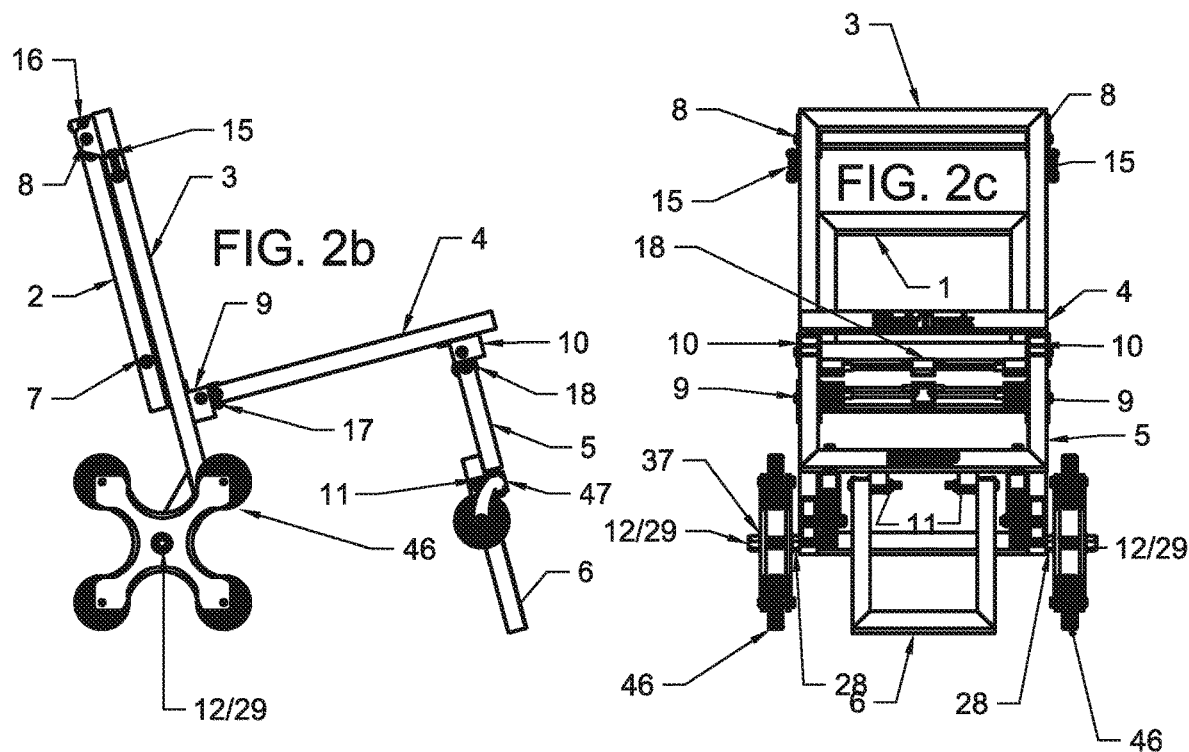

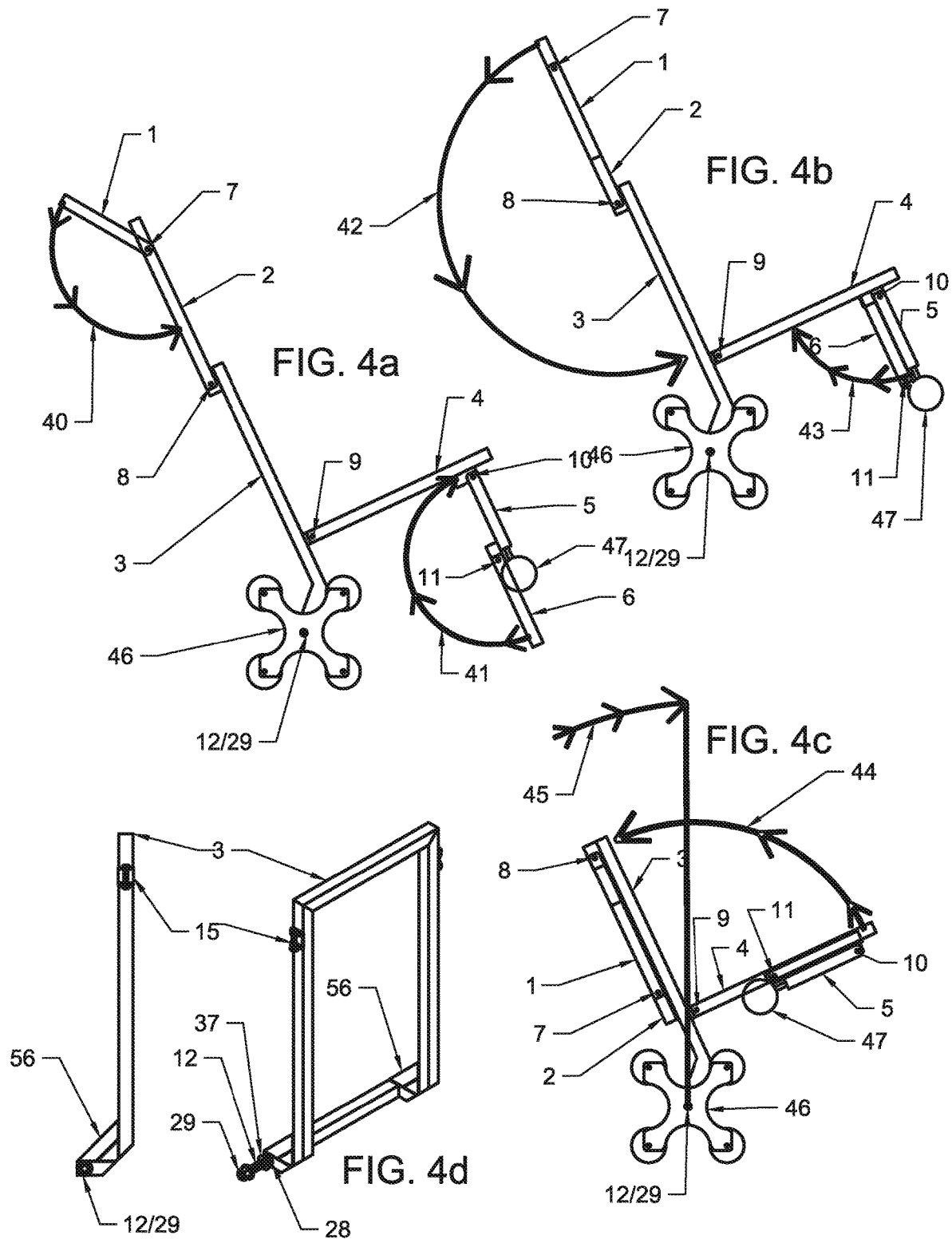

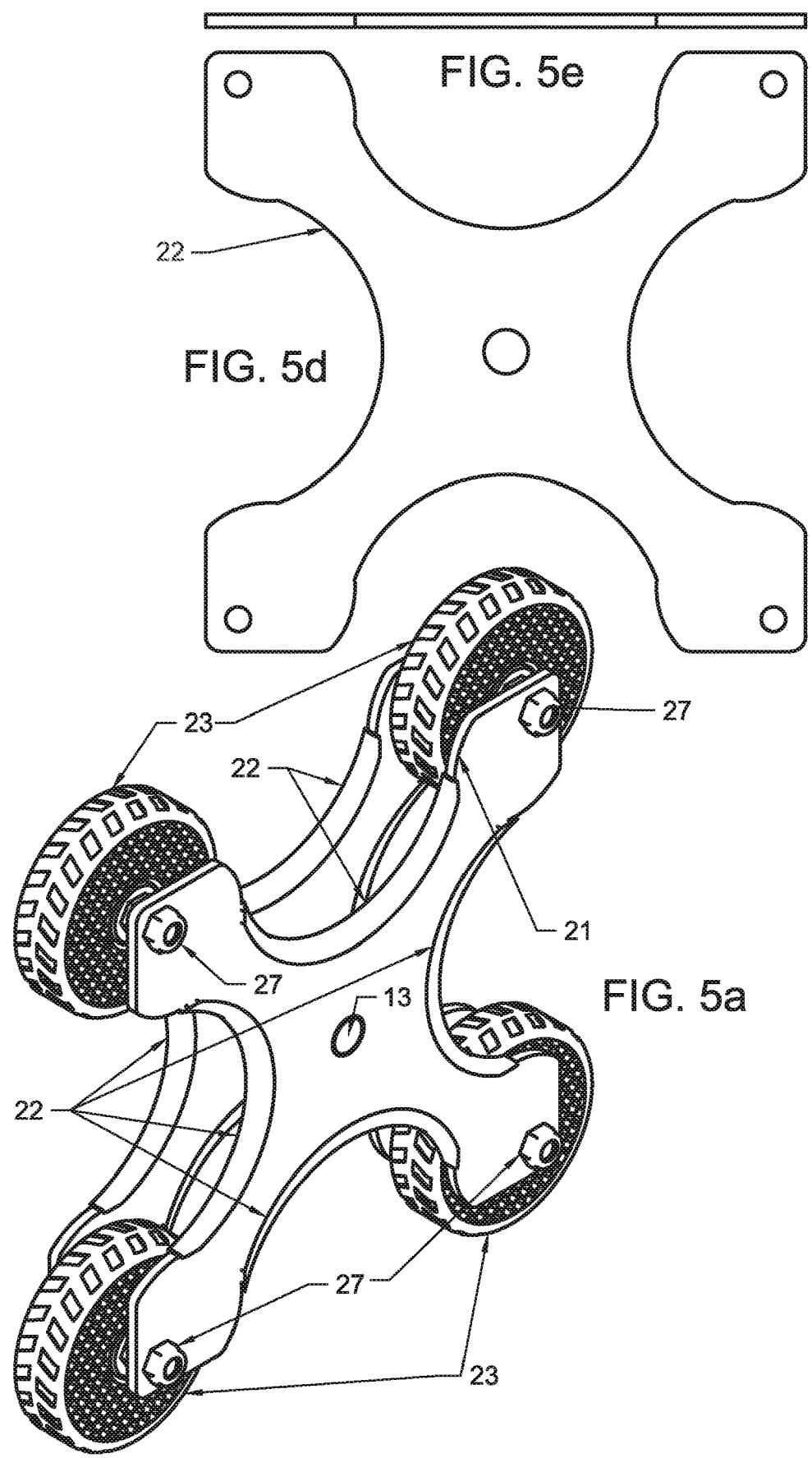

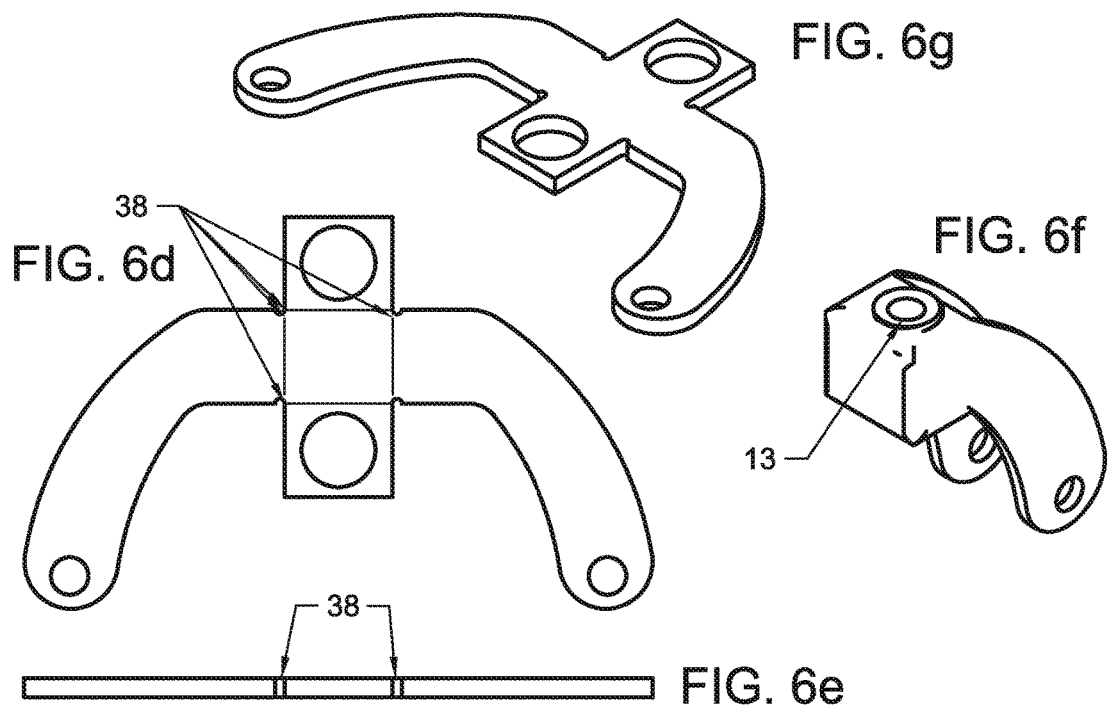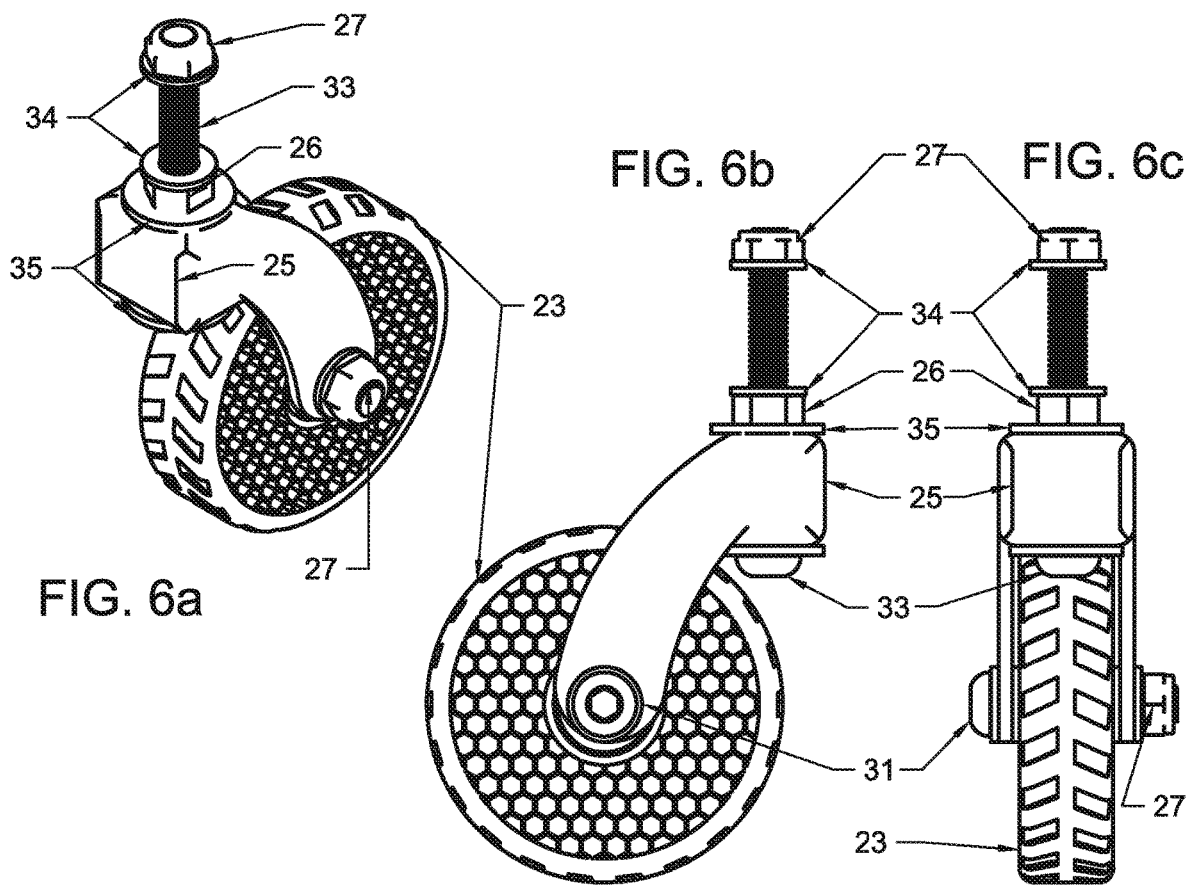

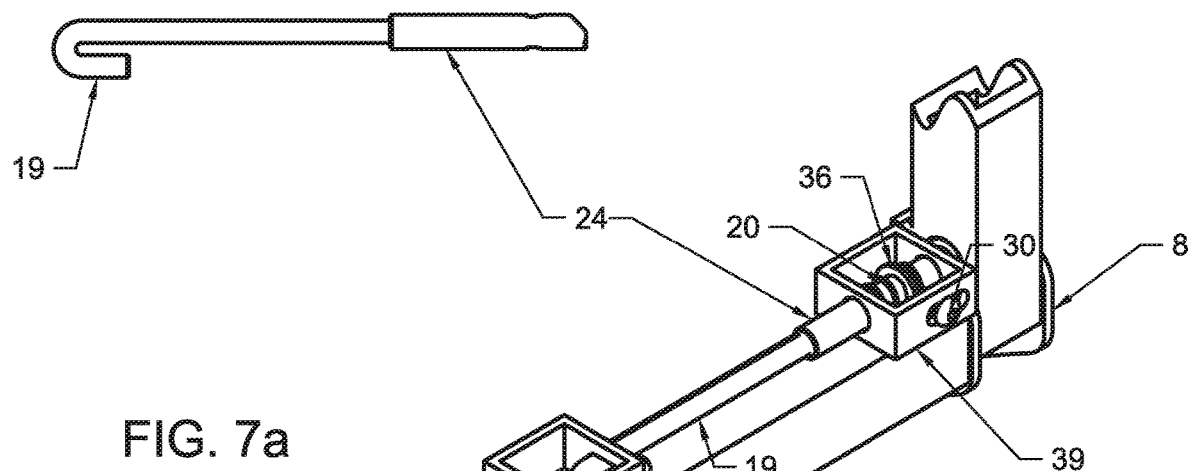
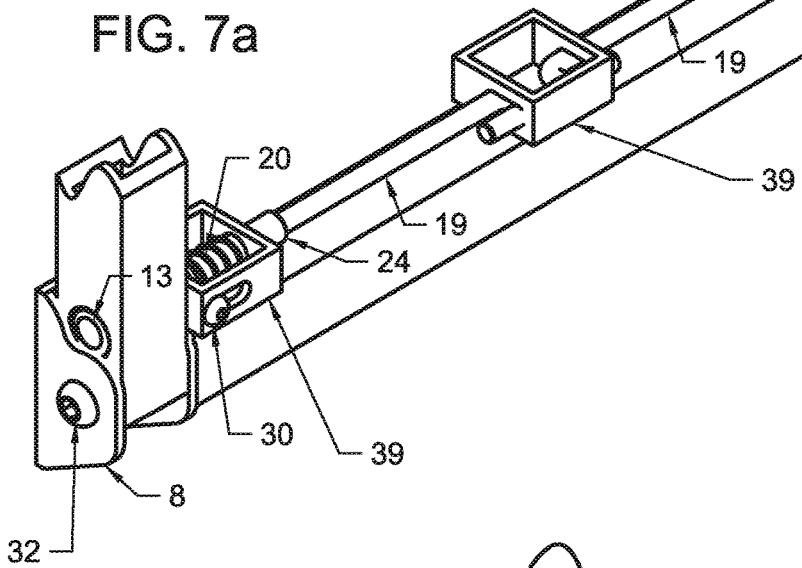
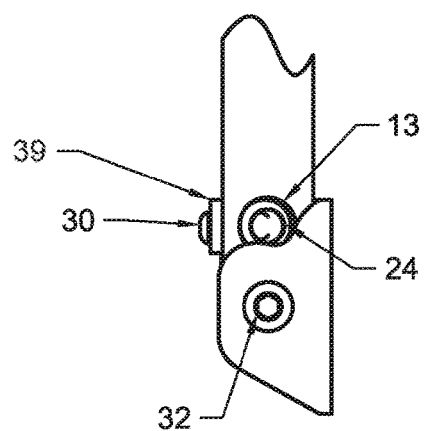

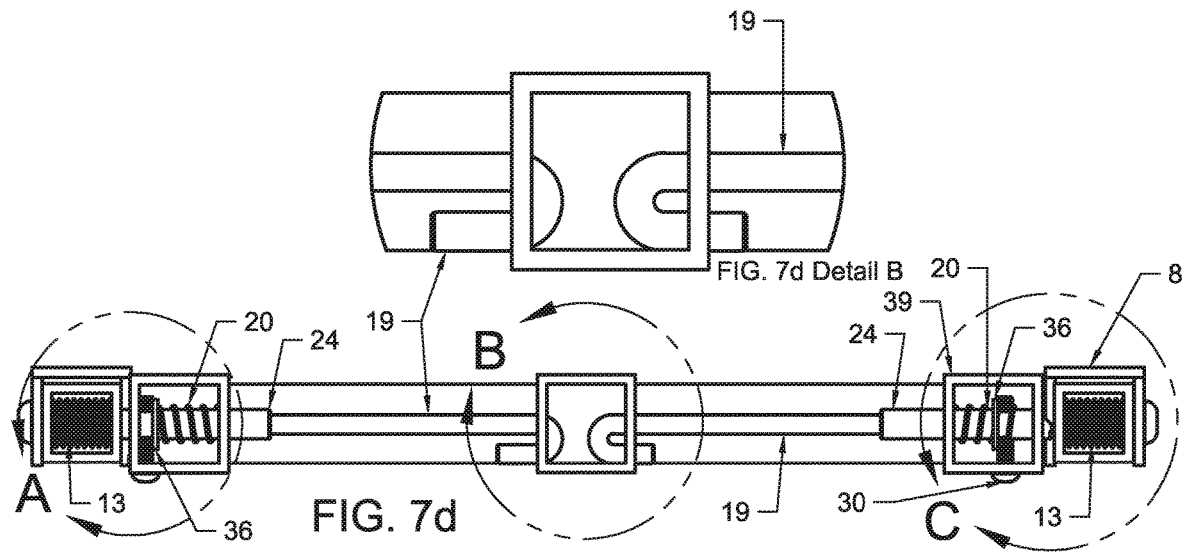
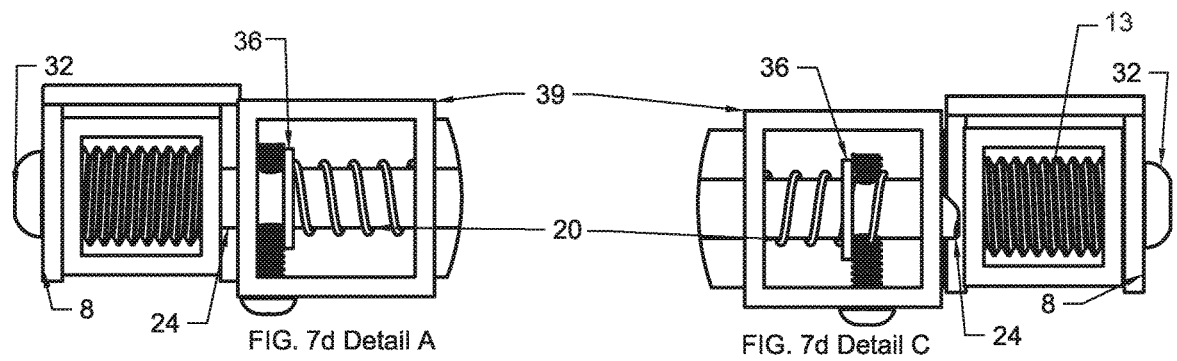
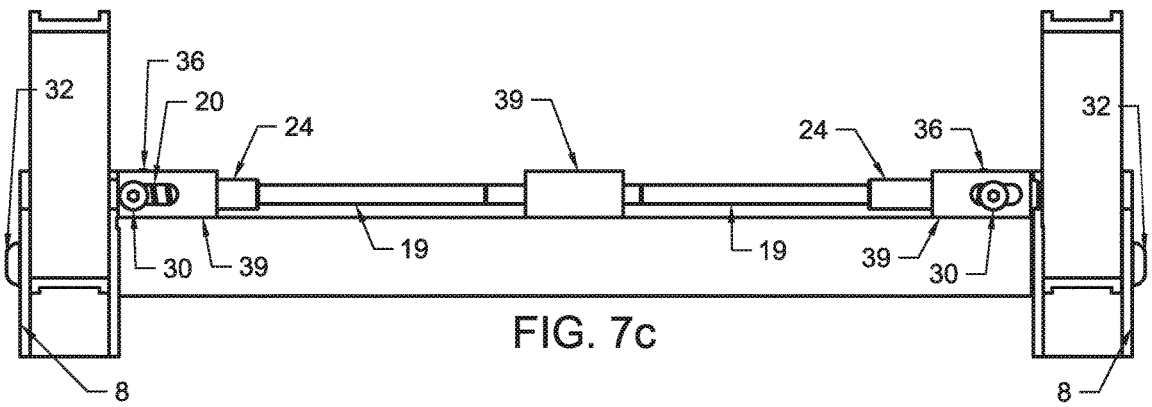

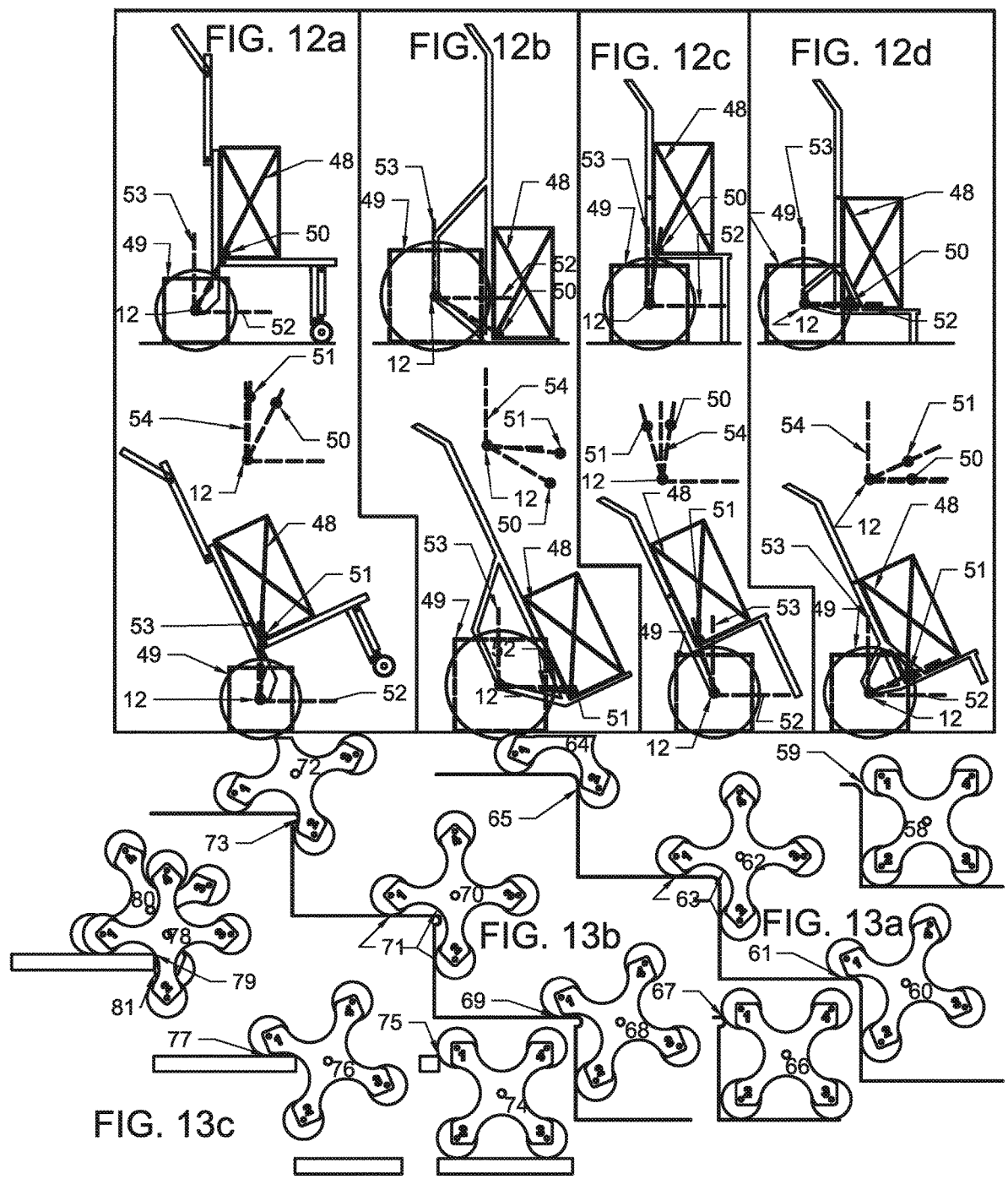

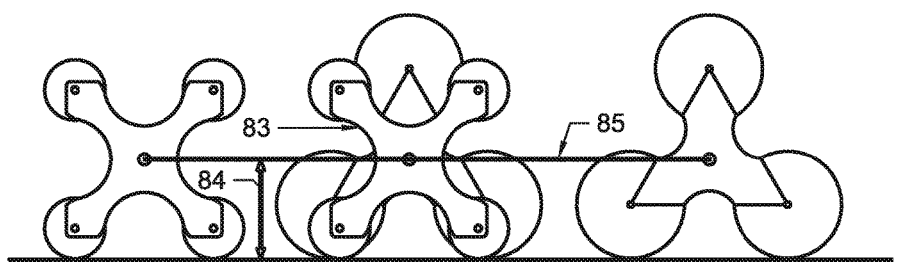
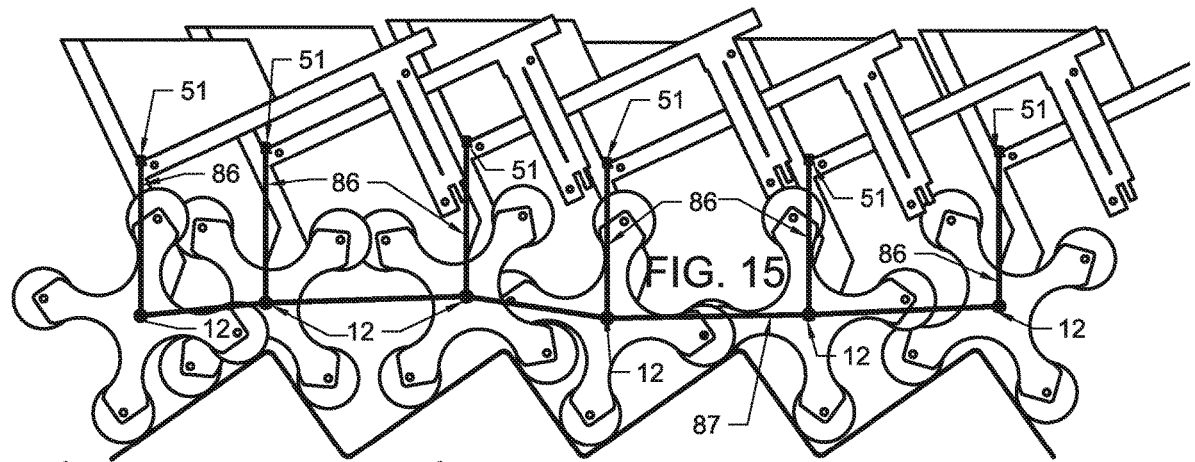
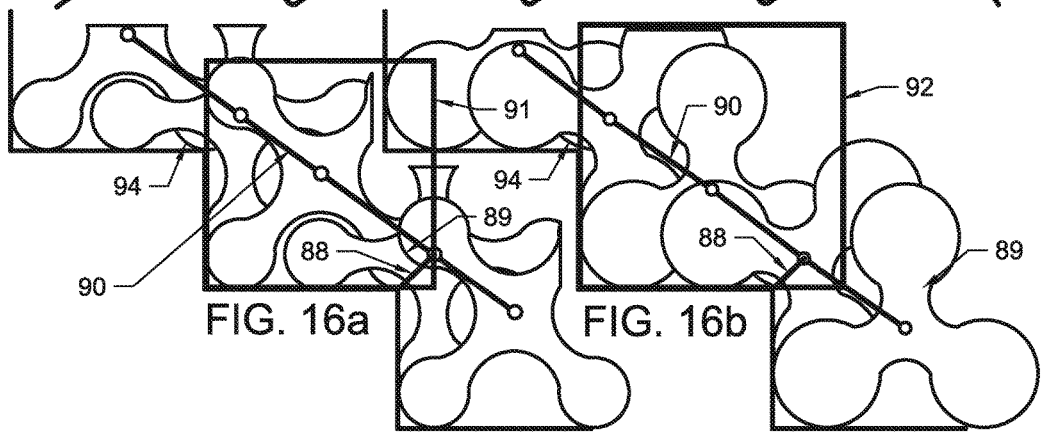

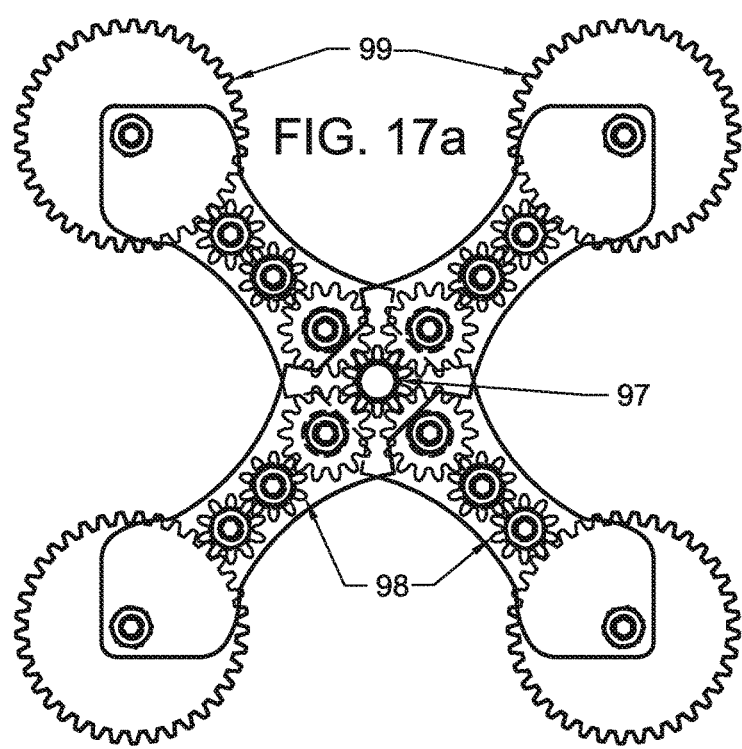
FIG. 17a
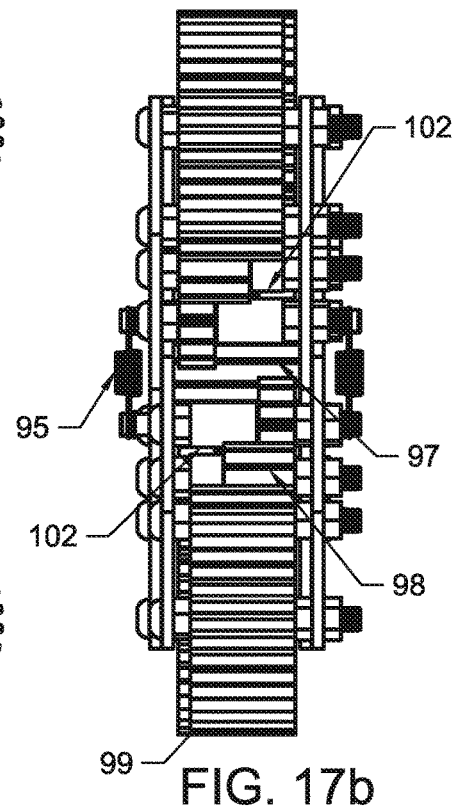
FIG. 17b
FIG. 17f
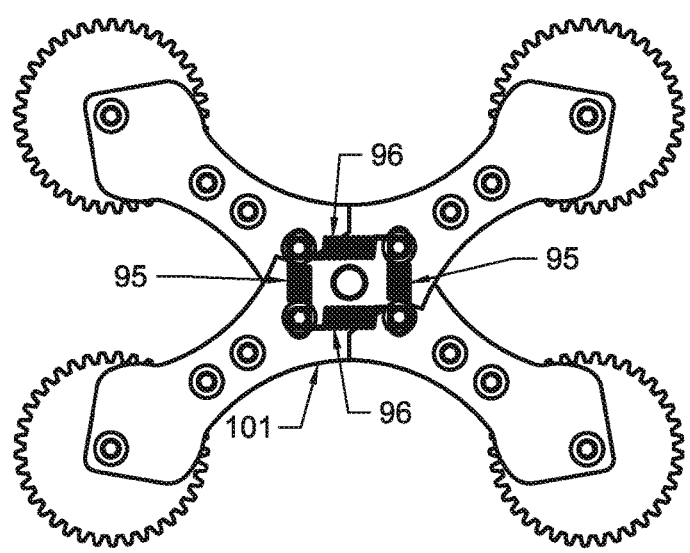

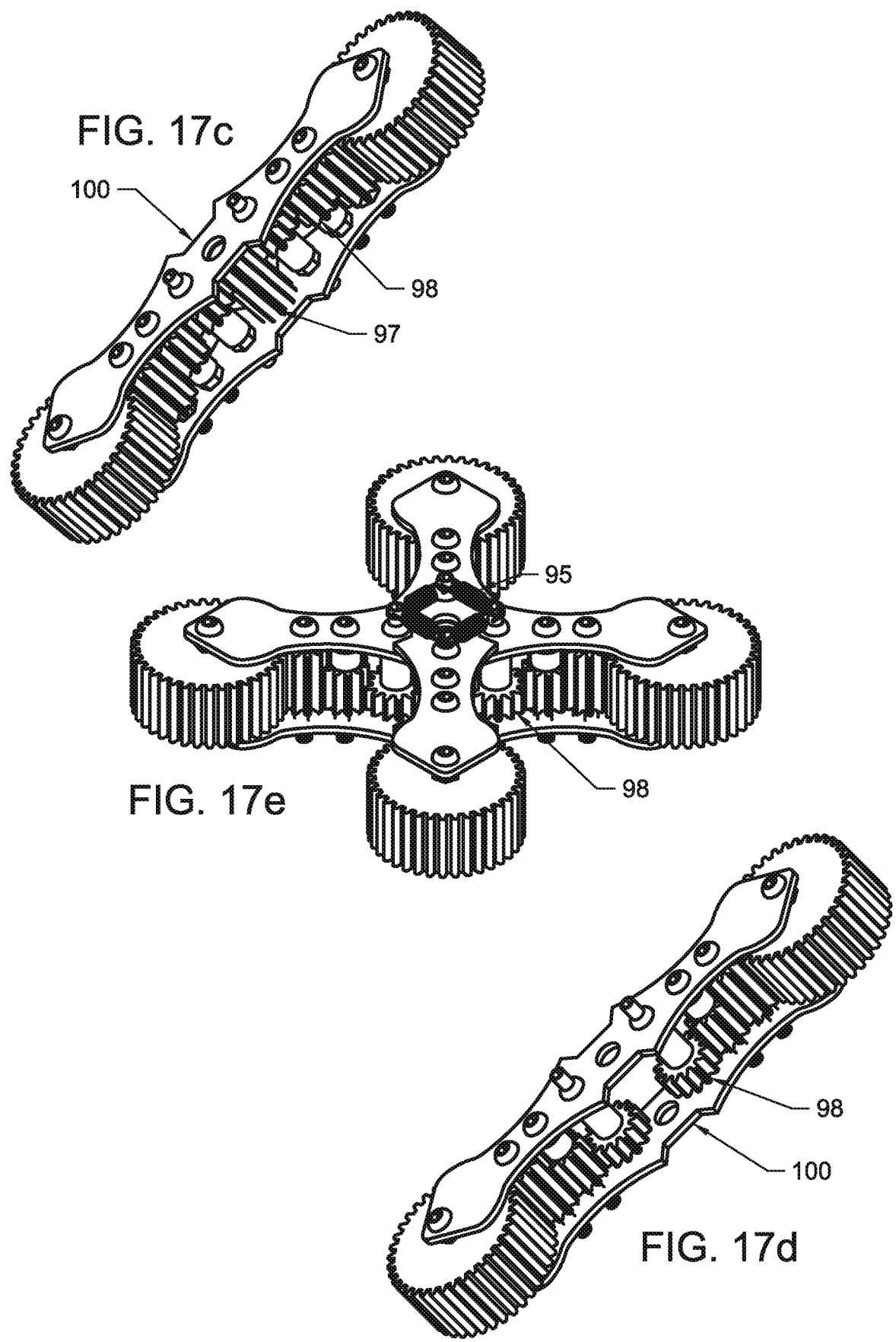

HAND TRUCK SYSTEM

CROSS REFERENCE TO RELATED APPLICATION

This application claims the benefit of U.S. Provisional Application No. 62/660,179, filed Apr. 19, 2018, which is incorporated by reference herein in its entirety.

FIELD

The present disclosure relates generally to systems and methods of moving and handling equipment and the like, including, for example, systems and methods for moving equipment/materials up and down stairs and/or across rise/run environments/terrain.

BACKGROUND

Devices which comprise a frame/platform/handles that are set on wheels for pushing/pulling, and are intended to aid in the movement of items/equipment, have been available for many years. There are plenty of specialized offerings for professionals in different industries (e.g., moving, logistics, material handling, building, warehousing and manufacturing, etc.), including some that have tri-wheel assemblies. Such conventional systems, however, have many deficiencies.

For example, conventional hand trucks are not capable of the improved operation of the systems and methods described herein because they suffer from one or more of the following deficiencies. Conventional hand trucks often position the load in a suboptimal position, are unable to tilt a load up/back slightly without the whole cart falling over backwards, cannot be moved without being tilted and there is no way to set them at a slightly tilted back position to remain there, and/or position the load in a different manner (in between 2 axles) without the ability to tilt equipment slightly back or up. All of these deficiencies, alone or in combination, make it difficult to lift and control the system and loaded equipment while tilted back and while walking and while ascending/descending stairs.

As such, there is a need for improved hand truck systems that provide a user with more flexibility of use, greater control of the load to be moved, and more efficient moving and handling both while moving equipment up or down stairs (or other rises/runs).

SUMMARY

Various hand truck systems and methods of use are disclosed herein. The following summary discloses various features that can be provided in one or more embodiments of the hand truck systems disclosed herein. However, it should be understood that various combinations of the individual elements are within the scope of the claimed invention, as well as different sub-combinations of elements disclosed in the different claims sets.

In one exemplary embodiment, the system can comprise: A collapsible frame assembly which employs locking mechanisms to maintain multiple expanded modes (and also allow frame collapse), A back set of rise/run traversal (e.g. stairs) Quad-Wheel assemblies, and A front set of "caster type" wheels assemblies.

In some embodiments, while expanded, the frame forces positioning of the load a minimum and specific distance and angle away from the systems axle. This keeps the load as centrally above the axle as possible, which results in easier maneuvering on both flats and on stairs (compared to traditional systems), and also allows for the system to be set in a tilted position without the whole system falling over backwards.

In some embodiments, the back Quad-Wheel assemblies comprises 4× equal size wheels in a square pattern with a main axle in the center of the square. The main axle height center is equal to or greater than 65% of a "standard" rise height, while keeping as compact a housing size as desired. The space between the wheels on the square sides is as wide as possible (while allowing the wheels to be as large as possible)—this allows the leading edge or hill of a rise/run point to get as close to the main axle as possible with each rotation. Variations of this assembly include internal gearing for drive and brake, other concentric expansion braking systems and built-in suspension for motorized operations.

The front wheel assembly can include a set of regular casters. Variations include casters which incorporate a rise/run traversal assembly such as a Quad-Wheel assembly.

In some embodiments, the system has three main modes: "push/pull", "tilt-set" and "fully collapsed". While in "push/pull", the system can loaded up with anything which will fit the physical size and weight capacity/limitations, and is either pushed or pulled using manual or motor force (using remote switch in the handle) to move the items to another physical location. While in "tilt-set" mode, the system can be tiled back, and the load faced up towards the user (without the system falling over backwards), and while in "fully collapsed" mode the system is at its most compact and ready for storage.

The foregoing and other objects, features, and advantages of the invention will become more apparent from the following detailed description, which proceeds with reference to the accompanying figures.

BRIEF DESCRIPTION OF THE DRAWINGS

FIG. 1a shows an isometric view of an exemplary system in 'push/pull' expanded mode with extension handle extended.

FIG. 1b shows a left side elevation of an exemplary system in 'push/pull' expanded mode with extension handle extended.

FIG. 1c shows a front elevation of an exemplary system in 'push/pull' expanded mode with extension handle extended.

FIG. 1d shows a top view of an exemplary system in 'push/pull' expanded mode with extension handle extended.

FIG. 2a shows an isometric view of an exemplary system in 'tilt set' expanded mode with extension leg extended.

FIG. 2b shows a left side elevation of an exemplary system in 'tilt set' expanded mode with extension leg extended.

FIG. 2c shows a front elevation of an exemplary system in 'tilt set' expanded mode with extension leg extended.

FIG. 2d shows a top view of an exemplary system in 'tilt set' expanded mode with extension leg extended.

FIG. 4a illustrates a side elevation view of an exemplary extension handle and leg collapse motion.

FIG. 4b illustrates a side elevation view of an exemplary handle and leg collapse motion.

FIG. 4c illustrates a side elevation view of an exemplary bed/back collapse and set upright motion.

FIG. 4d shows both a left side and isometric views of the frame back member only.

FIG. 5a shows an isometric view of the Quad-Wheel assembly.

FIG. 5d shows a left side elevation view of the Quad-Wheel assembly—plate only (no protection arcs).

FIG. 5e shows a front/top view of the Quad-Wheel assembly—plate only (no protection arcs).

FIG. 6a shows an isometric view of the caster assembly.

FIG. 6b shows a left side elevation of the caster assembly.

FIG. 6c shows a front elevation of the caster assembly.

FIG. 6d shows a top view of the caster assembly plate, before bend/weld.

FIG. 6e shows a front view of the caster assembly plate, before bend/weld.

FIG. 6f shows an isometric view of the caster assembly plate.

FIG. 6g shows an isometric view of the caster assembly plate, bend/weld into caster housing.

FIG. 7a shows an isometric view of the locking mechanism and frame section.

FIG. 7b shows a side elevation of the locking mechanism and frame section.

FIG. 7c shows a front elevation of the locking mechanism and frame section.

FIG. 7d shows a top view of the locking mechanism and frame section.

FIG. 7e shows a top view of the locking mechanism pin assembly.

FIG. 12a shows a side elevation of an exemplary frame and load position while standing and while tilted/rolling.

FIG. 12b shows a side elevation of the traditional 'L' frame and load position while standing and while tilted/rolling.

FIG. 12c shows a side elevation of the traditional 'H' frame and load position while standing and while tilted/rolling.

FIG. 12d shows a side elevation of the traditional 'L/H' frame and load position while standing and while tilted/rolling.

FIG. 13a shows a side elevation of the Quad-Wheel assembly engagement with "Regular" stairs.

FIG. 13b shows a side elevation of the Quad-Wheel assembly engagement with "Bullnose" stairs.

FIG. 13c shows a side elevation of the Quad-Wheel assembly engagement with "Floating" stairs.

FIG. 14 shows a smaller Quad-Wheel assembly main axle with the same height as the traditional larger tri-wheel assembly FIG. 15 shows the Quad-Wheel assembly and a frame/load section traversing a horizontal rise/run terrain.

FIG. 16a shows an exemplary Quad-Wheel assembly axle trajectory (elevated slope) on US standard stairs.

FIG. 16b shows a traditional tri-wheel assembly axle trajectory (elevated slope) on US standard stairs.

FIG. 17a shows an "X Ray" side view of the Quad-Wheel sub assembly with internal drive/gear system and internal suspension FIG. 17b shows a front/top view of the Quad-Wheel sub assembly with internal drive/gear system and internal suspension FIG. 17c shows an isometric view of a single unit of the Quad-Wheel sub assembly with internal drive/gear system and internal suspension FIG. 17d shows an isometric view of the opposing unit of the Quad-Wheel sub assembly with internal drive/gear system and internal suspension (spun 90 degrees for comparison to other unit)

FIG. 17e shows an isometric top view of the Quad-Wheel sub assembly with single and opposing units installed together and suspension springs in place.

FIG. 17f shows a side view of the Quad-Wheel sub assembly compressed down—utilizing suspension in one direction.

DETAILED DESCRIPTION

Figure 3A:
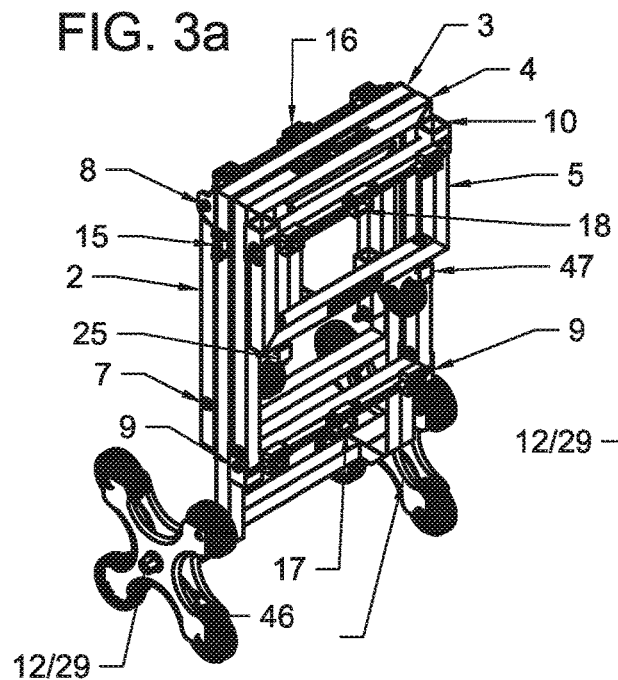
FIG. 3a shows an isometric view of an exemplary system in 'fully collapsed' mode.
Figure 3D:
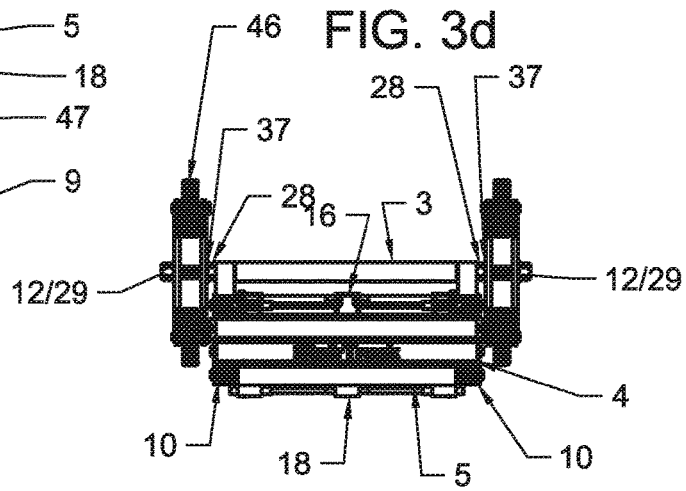
FIG. 3d shows a top view of an exemplary system in 'fully collapsed' mode.
Figure 3B:
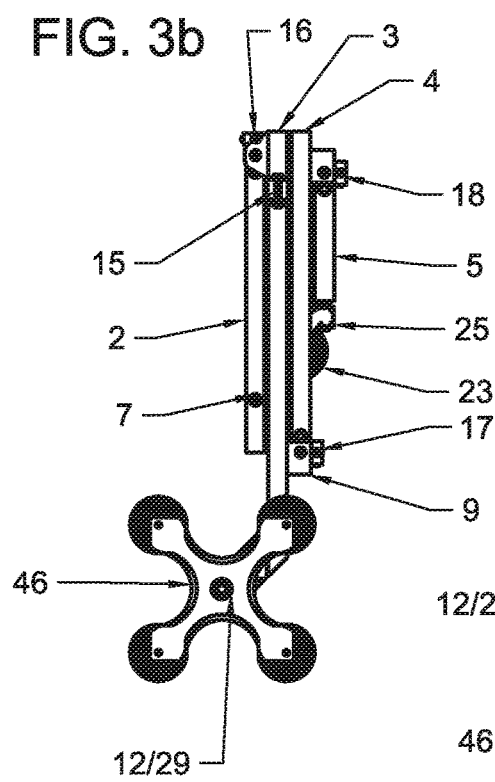
FIG. 3b shows a left side elevation of an exemplary system in 'fully collapsed' mode.
Figure 3C:
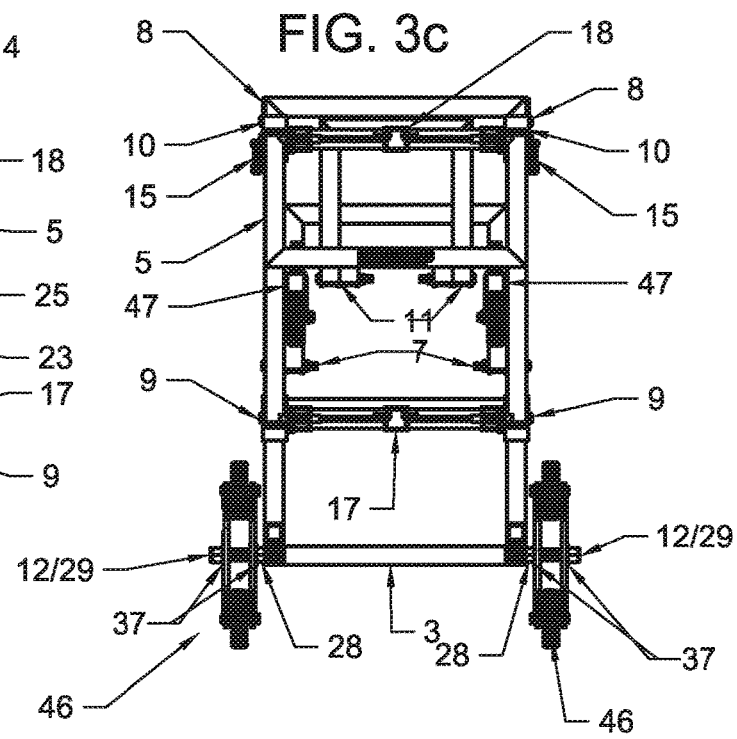
FIG. 3c shows a front elevation of an exemplary system in 'fully collapsed' mode.
Figures 5B, 5C:
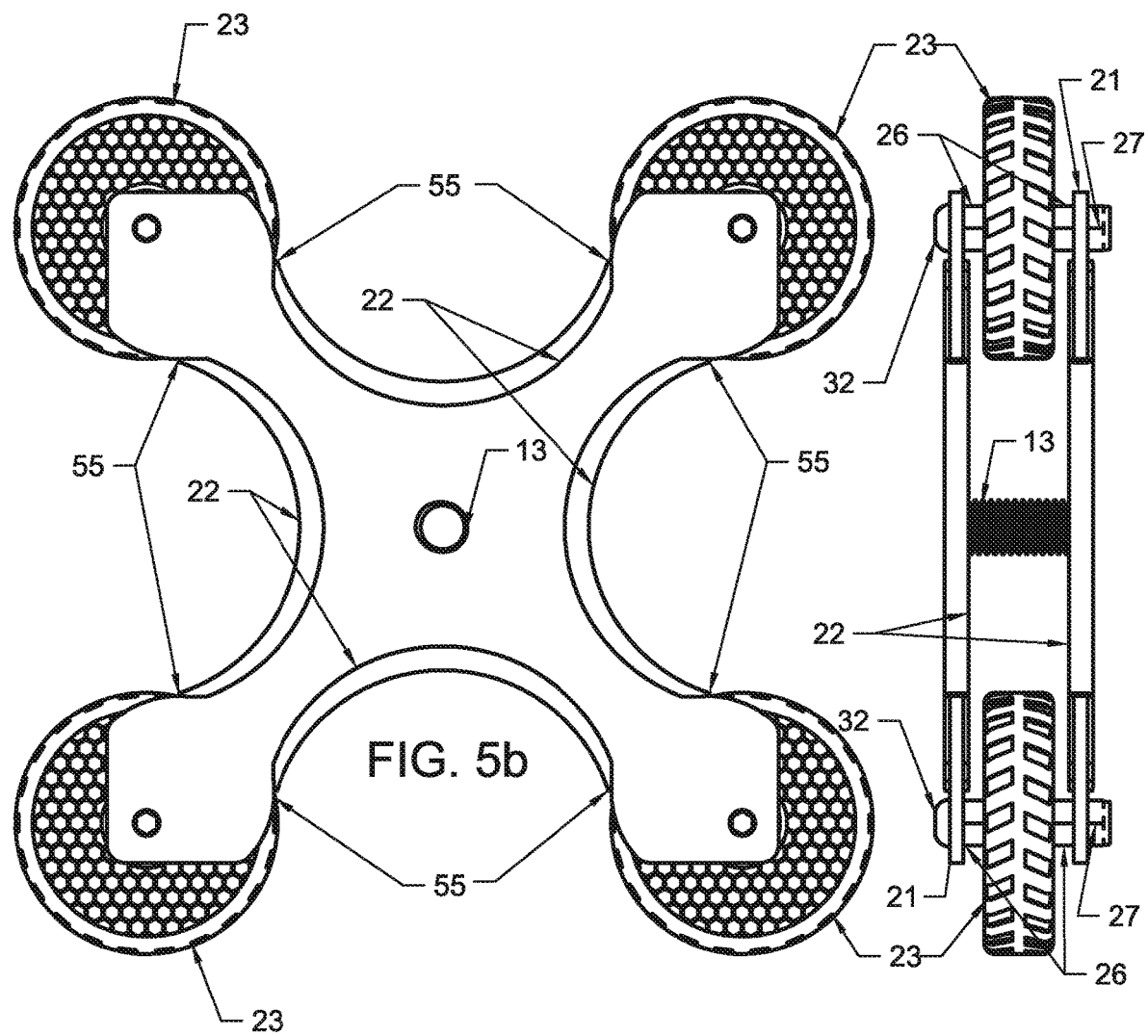
FIG. 5b shows a left side elevation view of the Quad-Wheel assembly.
FIG. 5c shows a front elevation view of the Quad-Wheel assembly.

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the term "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed system may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernible, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

As disclosed herein, various systems and methods for moving and handling various equipment and materials are provided. In some embodiment, the disclosed systems and methods can have application in any fields that require moving of equipment/materials up and down stairs (or across rise/run environments/terrain), and/or require their load be sometimes slightly tilted at rest. Some example include, but are not limited to, the movement and handling of equipment by musicians, DJs and media professional (e.g., heavy amps, sound desks, cameras/video equipment, crates of vinyl to gigs and on location), contractors (tilers, roofers, carpenters, welders, etc., to customer sites), sales personnel (e.g., hauling merchandise to customer sites), and remote/field equipment use (sound reinforcement, medical equipment, etc.), corporate offices (e.g., hauling files between floors). Many other applications of the systems and methods disclosed herein are possible.

Frame Systems

Referring to FIGS. 1a-1d, 2a-2d, 3a-3d and 4a-4d, the multi-member frame comprises a plurality of members than can be formed into a single structure. In this embodiment, for example, 6 individual members (e.g., aluminum square tubes) can be integrated by welding (e.g., TIG welding).

The U shaped extension handle 1 has steel threaded inserts (FIGS. 8a-8c) embedded in two sides at the location desired to set the hinge. It is connected by way of hex bolt 32 and lock/ed nut 27 through a hinge 7 to the U shaped main handle 2. The main handle 2 also has steel threaded inserts (FIGS. 8a-8c) embedded in two sides at the location desired to set the hinge and is connected by way of hex bolt 32 and lock/ed nut 27 through a hinge 8 to the back member 3. A locking mechanism 16 which is part of the back frame member 3 is employed to keep members 2 and 3 at 180 degrees while in "push/pull" mode.

The back member 3 is of particular design, which connects by way of hex bolt 32 and lock/ed nut 27 through a hinge 9 to the bed member 4, as well as houses/retains the axle 12, and positions the load optimally. More specifically, the back member 3 is considered a vertical member, and the bed member 4 a horizontal member. They meet at 90 degrees and can lock in that position with mechanism 17 for "push/pull" and "tilt set" mode/use. A load is considered to be normally placed, right at that 90 degree junction, and optimal load-to-axle positioning is assigned: as such the back member 3 has ~4× its thickness added 56 to it, positioning the axle 12 and the back wheel set 46 back, and/or pushing the load forward of the axle 12. This achieves 2 things: A: Optimal load positioning—while on flats or stairs, having the load over the axle, and nearer the user provides more control, and B: Provides the ability to tilt the system back without it falling over. The axle 12 in back member 3 is held in place using nuts 28 and enough axle 12 is left sticking out to connect a wheel set 46. Washers 37 and a lock/ed nut 29 are used to secure the wheel set 46 to the bottom of the back member 3. The connection point of the bed member 3 to the back member 4 is equal to the height of the back wheel set 46+15%-33% (this provides clearance for loads with wheels hanging down a few inches). The back member 3 has permanently attached mounts either side 15, which are intended as a point for securing an equipment tie-down strap The U Shaped bed member 4 has steel threaded inserts (FIGS. 8a-8c) embedded in two sides at the location desired to set the hinge. It connects to the U shaped main leg 5 (which also has steel threaded inserts 13 embedded in two sides at the location desired to set the hinge) by way of hex bolt 32 and lock/ed nut 27 through a hinge 10. This is also a 90 degree stop and uses locking mechanism 18 to hold that shape while in "push/pull" and "tilt set" mode/use. The main leg 5 is the mount point for a front wheel set 47.

A U Shaped extension leg 6 has steel threaded inserts (FIGS. 8a-8c) embedded in two sides at the location desired to set the hinge. It is connected to the main leg 5 by way of hex bolt 32 and lock nut 27 through a of hinge pair 11. This member is tucked away, folded up and back on the main leg member while in "push/pull" and "fully collapsed" modes, and gets folded out 180 degrees for "tilt-set" mode.

Referring now to only FIGS. 1a-1d, the system is presented in the "push/pull" mode. In this mode, both the extension handle 1 and main handle 2 are unfolded into their 180 degree locked positions. The extension leg 6 is folded 180 degree back up and under the unit.

Referring now to only FIGS. 2a-2d, the system is presented in the "tilt set" mode. In this mode, the system has several members positioned to allow setting the system tilted back (the loads face moves up toward the user), while hiding the handles. Extension handle 1 and Main handle 2 have been collapsed upon themselves, while the system is tilted back and extension leg 6 has been unfolded 180 degrees and the systems set back down at the angle.

Referring now to only FIGS. 3a-3d, the system is presented in the "fully collapsed" mode. In this mode, Extension handle 1 and Main handle 2 have been collapsed upon themselves, extension leg 6 and main leg 5 have been collapsed upon themselves, and bed member 4 has been brought upward to meet back member 3.

Figure 8A:
FIG. 8a shows a close-up isometric view of the threaded insert.
Figure 9A:
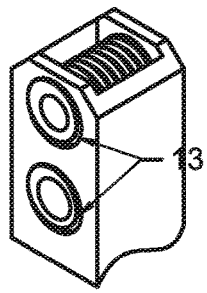
FIG. 9a shows a close-up isometric view of 2× threaded inserts embedded in frame member side.
Figure 10A:
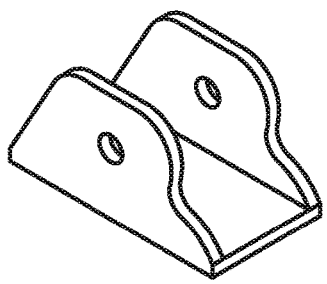
FIG. 10a shows a close-up isometric view of the 180 degree hinge.
Figure 8B:
FIG. 8b shows a close-up side elevation of the threaded insert.
Figure 9B:
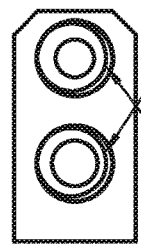
FIG. 9b shows a close-up side elevation of 2× threaded inserts embedded in frame member side.
Figure 10B:
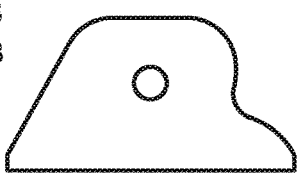
FIG. 10b shows a close-up side elevation of the 180 degree hinge.
Figure 8C:
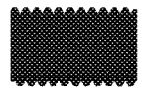
FIG. 8c shows a close-up front/top view of the threaded insert.
Figure 9C:
FIG. 9c shows a close-up front view of 2× threaded inserts embedded in frame member side.
Figure 10C:
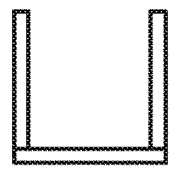
FIG. 10c shows a close-up front elevation of the 180 degree hinge.

Referring to FIGS. 4a-4c, the steps to collapse the system are presented a. Swing the extension handle 1 180 degrees to its folded position 40.
b. Swing the main handle 2 (and extension handle 1) 180 degrees into its folder position 42.
c. Swing the extension leg 6 180 degrees into its folded position 41.
d. Swing the main leg 5 (and extension leg 6) 90 degrees into its folded position 43.
e. Swing the bed member 4 (and main leg 5, and extension leg 6) 90 degrees into its folded position 44
f. Swing the back member (and main handle 2, and extension handle 1) ~20 degrees into an upright position.
g. Attach a "clasp" to keep system collapsed FIGS. 8a-8c show close up detail of the type of threaded insert used in the frame members at the hinge and locking pin points. There are 3 different threaded inserts in use in the system, the differences of which are only in the diameter of the through hole. Some are large enough for the axle, some are large enough for the lock pin, others are just large enough for the hinge bolt. FIGS. 9a-9d shows close up detail of a subsection of a frame member and a typical application and installation of 2 types of threaded inserts. Threaded inserts are held in place both with chemical fastener/threadlock, as well as mechanically by burring the frame over a notch in the threaded insert.

FIGS. 10a-10d show close up detail of the 180 degree hinge used to connect the main handle to the back member. They are fabricated out of aluminum square tube.

Figure 11A:
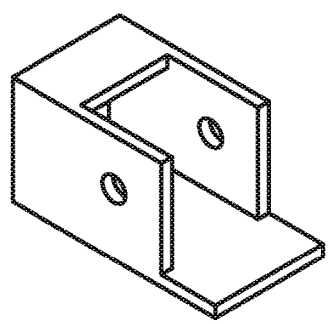
FIG. 11a shows a close-up isometric view of the 90 degree hinge.
Figure 11B:
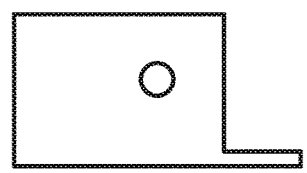
FIG. 11b shows a close-up side elevation of the 90 degree hinge.
Figure 11C:
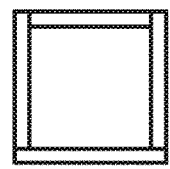
FIG. 11c shows a close-up front elevation of the 90 degree hinge.
Figure 9D:
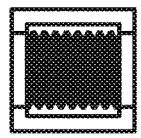
FIG. 9d shows a close-up top view of threaded inserts embedded in frame member side.
Figure 10D:
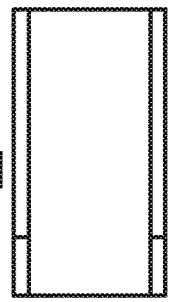
FIG. 10d shows a close-up top view of the 180 degree hinge.
Figure 11D:
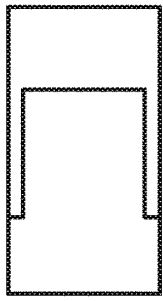
FIG. 11d shows a close-up top view of the 90 degree hinge.

FIGS. 11a-11c show close up detail of the 90 degree hinge used to connect the bed member to back member, as well as the main leg to the bed member. They are also fabricated out of aluminum square tube.

Referring now to FIG. 12, a side view of a frame design (FIG. 12a) is shown next to examples of the typical/traditional "L", "H" and "L/H" frame design (FIGS. 12b-12d). The upper set of frames shows the units in standing (S) position, and the lower set of frames shows the units tilted back 25 degrees to show rolling (R) position (used on both flats and up/down stairs). On each of the frames we see common references: a uniform load 48, an axle 12, a representation of a back wheel set 49, a dotted line "+X Axis" to the right of the axle 52, and a dotted line "+Y axis" upwards from the axle 53, all of which aid in load-to-axle positioning.

The difference between each frames load-to-axle positioning is illustrated using the mini chart 54 on each of the FIGS. 12a-12d. In each occurrence the position of the load is noted as a plot/point on a chart, showing the axle (A) 12 at 0,0 and the relative positioning of the load while standing (S) 50 and while rolling (R) 51. On FIG. 12a (the frame system) we see on chart 54 that the standing position 50 is almost exactly directly above, and forward 25 degrees (+X) to the right of the rolling position 51 which centers the load directly above the axle and is optimal for traveling. When in standing position, this load-to-axle positioning leaves room to tilt the unit back 25 degrees without going beyond the "Y" line and falling backwards—and so optimal on both data points. By comparison the other FIG. 12b-12d also show the same charted standing/rolling/axle details, yet all at sub-optimal load-to-axle positions for either transit/travel (as close to riding above the axle provide the easier maneuvering) and/or tilt-back. FIG. 12b's load is far out in front and below the axle, FIG. 12c's leaves no room to tilt the unit back without it falling over backwards. FIG. 12d's load is out in front of the axle and does not provide any ability to keep the unit tilted back.

Although the frame system and components has been described herein as being formed primarily of TIG welded aluminum square tube, it should be understood that other materials can be used, such as bent round pipe/tube, steel, plastics/polymers, composite materials (e.g., carbon fiber composites), as well as other methods of and manufacturing the integral frame system from these materials (e.g., other welding methods, mechanical fasteners, and/or adhesives).

Wheel System(s)

Referring now in general to FIGS. 5a-5e, the quad wheel assembly comprises 2× identical quad wheel aluminum plates 21/5d/5e, 8× inner arc protection material 22 (plastic, silicon, rubber, or anything that is softer than wooden stairs), a threaded insert 13, and 4× tires each with 2×608 ball bearings 23. The sub-assembly is rigidity formed into a housing using 4× hex bolts 32, regular nuts 26 and lock/ed nuts 27, which double as wheel axles.

The quad wheel plate is of particular design and as such has taken into account a number of aspects/variable regarding the material used and how the wheels and assembly engages with rise/runs or stairs:

a. The placement of the axle: (above the ground, and away from the current stair units rise the center of which needs to be 65%+ of the rise of a standard US stair set to achieve appreciable smoothing. (FIG. 14 shows how the quad wheel assembly axle height 84, 85 can achieve the same as a typical tri-wheel assembly, yet with a smaller overall package. 83 shows the quad wheel assembly overlaid on top of a typical tri-wheel assembly for size comparison)

b. The placement of the 4× equal sized wheels in FIGS. 5a-5c 23 in a square pattern: each of which need to be an equal distance from the closest wheel and each equally distanced from a hub located at the center of the square.

c. The wheel size/spacing and stair peaks ability to gain access to axle: In order to gain maximum smoothing, the peak of the stair needs to be able to get as close to the axle as possible while the assembly is rotating across a rise/run. Therefore the wheel 23 size needs to be a happy medium between providing space for the stair peak, and performance as a wheel (larger wheels often provide a smoother run). In turn the inner arc section of the plate needs to reach a happy medium of providing strength needed, while as much axle access as possible (more axle access with smaller wheels could mean weaker housing)

d. The ability to tackle bullnose and platform stairs: Traditional tri-wheel assemblies struggle in this area, and this quad plate designs "inner arcs" and surface protection FIGS. 5a-5c 22 provides the ability to smoothly traverse both bullnose and platform stairs (FIGS. 13b and 13c contain visual details as to the difference of these stair types compared regular stair types FIG. 13a.) while not marring stair surfaces.
  i. The junction/hand off between inner arc and wheel FIG. 5B 55; When the solution is used on platform/bullnose stairs, the junction/hand off between inner arc and wheel 55, is key to smoothing the traversal of bullnose platform stair types. Without it bumps are introduced into the axle flow.

e. Fortifying soft material with the threaded insert (FIGS. 8a-8c). As with previous implementations of the threaded insert, it is both chemically fastened/thread locked as well as mechanically fastened (aluminum burred over notch in insert)

Referring now to FIGS. 13a-13c, which shows a minimal sized quad wheel assembly and how it engages with different stair types (regular, bullnose and platform), during stages of its revolution. FIG. 13a 58 shows initial stage with a regular stair unit rise, note the small gap 59, which does not exist on bullnose initial engagement FIG. 13b 66,67 nor platform initial engagement FIG. 13c 74,75. At the second stage of regular stair traversal FIG. 13a 60, the assemblies "1st wheel" engages the peak of the rise/run of the next stair unit up 61. The same is true of bullnose FIG. 13b 68,69. The platform stair at this stage engages with the protection arc on the quad wheel housing FIG. 13c 76,77 to smoothly continue the flow/motion at the elevated slope angle. At the third stage of regular stair traversal FIG. 13a 62, the quad wheel housing is at the midpoint between starting and finishing a stair or rise/run unit. It is angled at 45 degrees and both wheels are engaged with the rise and the run of the current unit 63. Similarly the mid-point on a bullnose stair FIG. 13b 70 shows engagement with only the wheels on the rise and the run of the current unit 71. For platform stairs at the midpoint FIG. 13c 78 the quad wheel housing protection arc continues to engage with the stair 79. During the fourth and final stage of traversal, the quad wheel assembly on regular stairs FIG. 13a 64 will finish off with only the "2nd wheel" engaged with the stair 65, meaning that at no point does the stair touch the quad wheel housing protection arc FIG. 5b 22 on regular stairs. During the final stage on bullnose stairs FIG. 13b 72 the plastic protection arc FIG. 5b 22 engages with the bullnose 73 and takes advantage of the quad wheel plate design feature FIG. 5b 55 that provides smooth hand-off/transition between the quad wheel housing protection arc FIG. 5b 22 and the wheels 23 in bullnose stair traversal instances. Only during exit does the stair touch the quad wheel housing protection arc FIG. 5b 22 on bullnose stairs. Finally, during the fourth stage of platform stair traversal, the FIG. 13c 80, the quad wheel assemblies wheels engage with the platform 81, smoothing the transition over the peak. Only during entry and the midpoint does the stair touch the quad wheel housing protection arc (FIG. 5b 22) on platform stairs Referring now to FIG. 15. This illustrates the ability for the hand truck system to traverse horizontal rise/run environments while keeping the trajectory of the axle 12 mostly horizontal line 87, and the keeping the rolling load (R) 51 mostly directly above the axle 86 at all times.

Referring now to FIGS. 16a-16b, a comparison of a quad wheel assembly as disclosed herein and a traditional/typical tri-wheel assembly is shown on a typical set of stairs. This shows the ability of the quad wheel assembly to provide the same smoothing slope as the typical tri-wheel, but at an overall decreased size. FIG. 16a is the quad assembly side and shows the assembly in 5 positions (3× on stairs, 2× midpoint) on the stairs. The right side FIG. 16b is the traditional/typical tri-wheel assembly side and also shows the assembly in 5 positions (3× on stairs, 2× midpoint) on the stairs. The slope 90 indicates the ability for the axle to take a linear path up the rise/run, utilizing an "elevated" slope in both cases. FIG. 16a 89 shows a small gap (therefore smoother performance) on the quad wheel assembly compared with FIG. 16b 89 much larger gap that needs to be travels on each rotation. FIGS. 16a-16b 88 show the same gap between the stair peak and each of the assemblies' second stages. 91 shows a box the size of this embodiment's quad wheel assembly and 92 shows a box the size of the traditional/typical tri-wheel assembly. The box 92 is clearly larger—there is a little gap between the top of the box 92 and the top of the wheel in the tri-wheel assembly, as when the tri wheel assembly is rotated 90 degrees it will require that whole space. FIG. 16b 94 shows the larger typical tri-wheel assembly struggling to sit completely on a some standard US stair runs, and FIG. 16a 94 shows the quad wheel assembly embodiments increased ability to sit wholly on a stairs run.

Referring now in general to FIGS. 6a-6g, the front wheel set caster assemblies comprise a one piece aluminum caster frame/housing FIGS. 6d-6g, which is bent 90 degrees 4× at lines 38, then seams welded to form the welded frame/housing 25/6f. A threaded insert 13 is fastened, in a similar fashion as previously described, into the existing holes, and a hex bolt 33, large washers 35, small washers 34, regular nuts 26 and lock/ed nuts 27 are inserted into/used in the threaded insert 6a, 6b and 6c. 1× tire with 2× 608 ball bearings 23 is held in with hex bolts 31 and a lock/ed nut 27.

Although the wheel systems have been described herein as being formed of aluminum plate, it should be understood that other materials can be used, such as steel, plastics/polymers, composite materials (e.g., carbon fiber composites) etc.

Locking System(s)

Referring now to FIGS. 7a-7e, the main locking mechanisms used to keep the frame in "push/pull" and "tilt set" modes, as well as used to release the frame into "fully collapsed" mode, are found in 3 locations on the hand truck system. These mechanisms are not exactly the same, but all operate the same way—the differences are in which way the set screws and finger/thumb "buttons" face per application: locking handle/back, back/bed or bed/leg.

The spring loaded locking mechanism comprises a base member of aluminum square tube. 3× pin assembly housing members 39 and 2× pin assemblies 19/24 retained using washer 36/spring 20/set screws 30. To be useful, it requires pin receiving unit(s) such as another frame member with threaded inserts 13 inserted.

More specifically, the 2× outer pin assembly housings 39 have through holes sized for the pin assembly 19/24 to be inserted in one orientation, and slots for positioning a set screw 30 in the other orientation. The single central pin assembly housing 39 has slots either side which are the same thickness as the smaller diameter, longer piece of material 19 (and 2× as wide), and are the second point for the pins assemblies to be retained.

The pin assemblies in the exemplary embodiment are made up of 2 pieces. Firstly a smaller diameter, longer piece of material 19 of which one end is bent back on itself in a hook, and the other end is threaded a length equal to approximately ½ the length of the short part of the hook. The length of this first piece must fit between the space of the outer pin assembly housings and central pin assembly housing, otherwise final assembly is impossible. Secondly a larger diameter, shorter piece of material 24 is used, and which one end is angled off (similar to a traditional house door lock mechanism protruding "pin"). The other end is center drilled and tapped to match the length and thread of the first piece.

The pin receiving units exist on the main handle, the bed member, and main leg, and are made up of similar threaded inserts 13 to those used in conjunction with the hinge bolts 32. They are in existence to provide a place for the pin 24 to lock into (therefore locking/setting the position of the two frame members), as well as serve to fortify what would ordinarily be a hole through softer hollow material (square aluminum tubing).

To assemble, the outer pin assembly housings 39 are setup with washers 36 which provide uniform force to springs 20 (which are sized to go around the pin, but not be thicker than the pin assembly housing member). The smaller diameter, longer piece of material 19 is lowered into the space between the central pin assembly housing 39 and an outer pin assembly housing 39, then with threaded end facing out, the piece is inserted through the spring 20, washer 36 and outer pin assembly housing member 39 holes so that the thread is accessible pointing out and the hook is between the central and outer pin assembly housing members. The larger diameter, shorter piece of material 24 is threaded onto the first piece, then the 2 pieces as a unit are pushed back in towards the central pin assembly housing member 39, and the hook is seated into the slot there. The spring 20 is compressed to allow access to the threaded hole in 24, and a set screw 30 is passed through the pin assembly housing member slot and screwed in, completing the sub-assembly. This provides sprung linear motion, leaving the pin in its extended position (protruding beyond the outer pin housings) as normal/at rest.

Although a chemical fasteners/thread lock is used to fasten these pieces 19/24 together (as well as set screw 30 into piece 24), it is not necessary due to the way which the locking mechanism is designed—it cannot self un-assemble due to vibrations because the force of the spring on the set screw 30 at all times, which both prevents that screw backing out but the screw itself locks the piece 24 from spinning off piece 19 which is also locked from axial turning by the central pin housing assembly slot it is retained in.

The hook on pin assembly piece 19 is used as a place for a user's fingers to grip and depress in order to release the mechanism. FIG. 7*d* Detail B 19 shows the comparison between a depressed pin (Right) and an, at rest/not-depressed pin (Left). Similarly, FIG. 7*d* Detail A 24 shows the pin protruding through the pin receiving unit at rest, and FIG. 7*d* Detail C 24 shows the pin retracted as a result of someone pressing the two hooks 19 together, intending to release the lock and collapse the members.

Once the locking mechanism sub-assembly is assembled, the base member is positioned between a set of hinges 8/9/10, lined up with the pin receiving units in another member and permanently fastened to the hinges 8/9/10.

Both extension handle locking and extension leg locking use compression fittings to achieve their setting in various positions (in both cases, the extreme angle of which the hinge is providing). Various other embodiments may use similar locking mechanisms as described in the locking systems section, or another solution.

Additional Alternative Embodiments

The following examples illustrate different methods of operation of the system. These examples, like the above disclosed examples, are illustrative only, and not intended to be limiting.

In another embodiments, the hand truck systems quad wheel assembly can include internal gearing FIGS. 17*a*-17*e* which cause the 4 wheels to simultaneously spin, and is driven by a spinning axle. Referring to FIGS. 17*a*-17*c* which shows the "sun gear" 97 at the center of the assembly, this gear attaches to the axle using a key and keyway to ensure it only spins with the axle. The sun gear 97 is surrounded by 4× gear trains 98. These gear trains must keep within the perimeter of the quad wheel assembly housing and deliver from the sun through the planet gear trains out to gear wheels or wheels which have the ability to have a gear alongside. In other embodiments gears and chains/belts are interchanged/mixed to achieve the same result of energy transference from the sun, through the "arms" of the quad wheel assembly and to the wheels. In this embodiment the hand truck system would employ a motor mounted to the frame, which interfaces directly with the axle also with a keyway and key, and utilize a variable switch somewhere accessible to operate the motor.

In other embodiments, the hand truck system can have an embedded suspension system. this is achieved by taking the existing quad wheel assembly plate and distilling it down to its diagonally opposite wheels only then combining two of these and some spring or elastic material. FIG. 17*c* shows an example of what one side of a suspension quad wheel housing would look like (minus the gears) and FIG. 17*d* shows what the other side would look like (minus the gears). These two units are brought together 90 degrees to each other and combined in a way that "nests" them see FIG. 17*e* bolts and pole pieces are added in a square pattern around the central hub and springs FIGS. 17*b,* 17*e,* and 17*f* 95,96 are installed to provide the suspended tension. When top pressure is applied, the 2× "90 degree nested 2× diagonal wheel quad wheel plates" rotate upon their center, and spring force is applied to return the assembly to the original position. FIG. 17*f* shows a compressed assembly with spring 95 at rest and spring 96 expanded.

The two aforementioned alternative embodiments are designed to work as independent or combined systems. Therefore both the internal gearing system and the embedded suspension systems can installed and used simultaneously. This can be achieved, for example, by way of diminishing thickness gears in the gear trains FIGS. 17*b*-17*e,* and added spacers 102 which provide room for an almost identical member FIGS. 17*c*-17*d* to be brought in at 90 degrees to each other, housing interlocked and share the use of the sun gear 97 while providing maximum clearance for suspension rotation/movement.

In other embodiments the frame is rigid (non-collapsible) and the disclosed load-to-axle positioning is used.

In other embodiments the frame is of foreign/different design, and the disclosed quad-wheel assembly is used.

In other embodiments the frame set and collapse capability is achieved using the disclosed locking mechanism.

In other embodiments the front caster wheel set is replaced with a similar stair climbing assembly as the backset, aiding the ability to PUSH load up stairs.

Figure Details

For convenience, a listing of the reference numbers and related parts/devices are provided below.

- 1—Frame Member: Extension Handle
- 2—Frame Member: Main Handle
- 3—Frame Member: Back
- 4—Frame Member: Bed
- 5—Frame Member: Leg
- 6—Frame Member: Extension Leg
- 7—Hinge/Joint: Extension Handle/Main Handle
- 8—Hinge/Joint: Main Handle/Back
- 9—Hinge/Joint: Back member/Bed member
- 10—Hinge/Joint: Bed member/Main Leg
- 11—Hinge/Joint: Main Leg/Extension Leg
- 12—Main axle
- 13—Steel Threaded Inserts
- 14—Frame Member Threaded Insert Detail
- 15—Equipment Tie-Down Strap Mount
- 16—Main Handle/Back Locking Mechanism
- 17—Back/Bed Locking Mechanism
- 18—Bed/Leg Locking Mechanism
- 19—Locking Mechanism Pin Assembly ¼" hook
- 20—Locking Mechanism Spring: ⅜×1"
- 21—Quad-Wheel Plate
- 22—Quad-Wheel Plate Protection Arc
- 23—Airless Tires
- 24—Locking Mechanism Pin Assembly ⅜" piece
- 25—Welded Caster Housing
- 26—M8 Regular nut
- 27—M8 Lock/ed nut
- 28—½" Regular nut
- 29—½" Lock/ed nut
- 30—1" 10-24 Hex Bolt
- 31—40 mm M8-1.25 Bolt
- 32—45 mm M8-1.25 Bolt
- 33—75 mm M8-1.25 Bolt
- 34—M8 Washer Small
- 35—M8 Washer Big
- 36—⅜" Washer
- 37—½" Washer 38—Fold lines for Welding Caster Housing
39—Locking Mechanism Pin Housing
40—145 degree Extension Handle arc of collapse
41—180 degree Extension Leg arc of collapse
42—180 degree Main Handle arc of collapse
43—90 degree Main Leg arc of collapse
44—90 degree Bed/Back arc of collapse
45—25 degree arc to straighten unit upright=FIG. 3b
46—Multi-Wheel Assembly Set
47—Caster Assembly Set
48—Generic Load
49—Generic Uni/Multi Wheel Assembly
50—Position of Load with relation to the axle (A) during standing (S)
51—Position of Load with relation to the axle (A) during rolling (R)
52—"X" Axis—Forward of axle
53—"Y" Axis—Upwards/Downwards of axle
54—Standing (S) to Rolling (R) positions of load with relation to axle
55—Handoff/transition between Quad Wheel plate inner arc and wheel
56—Indicates position of back member vertical piece and back-positioned axle
58—"Regular" Stair Engagement—Starting position
59—"Regular" Stair Engagement—Initial Gap
60—"Regular" Stair Engagement—Quad-Wheel Assembly 22.5 degrees through a turn
61—"Regular" Stair Engagement—As first contact wheel rolls over first contact point
62—"Regular" Stair Engagement—Quad-Wheel Assembly 45 degrees through a turn
63—"Regular" Stair Engagement—shows 2 wheels in contact and zero arc touch
64—"Regular" Stair Engagement—Quad-Wheel Assembly 67.5 degrees through a turn
65—"Regular" Stair Engagement—Finishing single stair climb, wheel only in contact
66—"Bullnose" Stair Engagement—Starting position
67—"Bullnose" Stair Engagement—Initial Engagement
68—"Bullnose" Stair Engagement—Quad-Wheel Assembly 22.5 degrees through a turn
69—"Bullnose" Stair Engagement—As first contact wheel rolls over first contact point
70—"Bullnose" Stair Engagement—Quad-Wheel Assembly 45 degrees through a turn
71—"Bullnose" Stair Engagement—shows 2 wheels in contact and zero arc touch
72—"Bullnose" Stair Engagement—Quad-Wheel Assembly 67.5 degrees through a turn
73—"Bullnose" Stair Engagement—Finishing single stair climb, while arc makes contact with stair
74—"Floating" Stair Engagement—Starting position
75—"Floating" Stair Engagement—Initial Engagement
76—"Floating" Stair Engagement—Quad-Wheel Assembly 22.5 degrees through a turn
77—"Floating" Stair Engagement—As first contact wheel rolls over and arc makes contact with stair
78—"Floating" Stair Engagement—Quad-Wheel Assembly 45 degrees through a turn
79—"Floating" Stair Engagement—shows arc making contact with stair
80—"Floating" Stair Engagement—Quad-Wheel Assembly 67.5 degrees through a turn
81—"Floating" Stair Engagement—Finishing single stair climb, wheel only in contact
83—Quad-Wheel assembly overlaid on top of a traditional Tri-Wheel assembly
84—Vertical Line indicting the same axle height between assemblies
85—Horizontal line indicting the same axle height between assemblies
86—Vertical Line illustrates position of load constantly and directly above the axle while traversing rise/run
87—Horizontal trajectory of axle while traversing horizontal rise/run with Quad-Wheel assembly
88—Distance between stair peak and axle during midpoint stage
89—Position of 1st wheel. Taking note of the distance between quad and tri-wheel assemblies
90—Elevated slope (matching axle position for this run)
91—Overall size of quad wheel assembly embodiment which achieves the same slope are larger tri-wheel
92—Overall size of traditions/typical tri wheel assembly which achieves the same slope are smaller quad-wheel
94—Shows disclosed embodiment and traditionals (in)ability to sit fully on a standard stair unit run at rest
95—Spring or elastic. At Rest. Any Suitable material that can expand and compress at the frequency/cycle required
96—Spring or elastic. Expanded. Any Suitable material that can expand and compress at the frequency/cycle required
97—Central drive/Sun gear. This is hard connected to the axle and a motor turns the axle
98—Regular drive/Planet gears. These transfer force from the Central drive gear to the gear access wheels
99—Gear access wheels. Wheels which have some type of gear/spur/cog system to take a chain or another gear/spur/cog
100—½ size or "Suspension" Quad-Wheel assembly plate
101—Arc formed when unit is extended while using suspension
102—Spacer Exemplary System Features In some embodiments, the hand-truck frame system comprises one of more of the following components (and/or components in other claim sets) in any combination:

6× Frame members (Extension Handle, Main Handle, Back Member, Bed Member, Main Leg & Extension Leg) which connect together using hinges on other frame members, providing the ability for the system to collapse upon itself.

A system(s) to lock the frame in upright/extended/collapsed positions

An axle capable of being manually or motor driven

Frame members which as fully assembled, create the means to attach independent separate 'front' and 'back' wheel sets or wheel systems, providing the ability to tilt and move like a hand truck OR push/pull like a push cart without tilting.

Frame member connections which when the system is fully expanded/upright, situates the axle back from the load up to 4× (or more) the thickness of the frame member when observing from a side elevation.

A folding extension to a frame member (a stand) which sets the frame in a 0-15 degree tilted position.

Built in equipment tie-down strap mounts.

The means for a motor mount and direct or indirect axle drive access.

In other embodiments, a rise/run traversing wheel system comprises one of more of the following components (and/or components in other claim sets) in any combination:

A housing with the means to attach 4 equal sized wheels, in a square pattern, each an equal distance from the closest wheel and equally distanced from a hub located at the center of the square.

A housing with arc'd areas nearest the hub, positioned to smooth initial and final engagement with bullnose and platform stairs A housing with at least ¼" clearance when the peak of the rise/run comes nearest to the axle, while rotating/traversing stairs. i.e. the housing doesn't touch regular stairs A central hub height which is equal to or greater than 65% of a standard stair rise height.

Protective devices on the housings arc'd areas, positioned to come in contact bullnose and platform stairs, to diminish damage.

A means to contain an internal drive/gearing system

In other embodiments, a spring-loaded locking mechanism comprises one of more of the following components (and/or components in other claim sets) in any combination:

A base member for the pin housing members to be mounted on.

Pin housing members with
  pin and retaining screw holes drilled, are attached to the base member
  1 unit is mounted centrally, on the base member, on a chosen side.
  1 unit is mounted at one end, on the same side of the base member as the centrally located housing member
  1 unit is mounted at the opposing end, on the same side of the base member as the centrally located housing member Pin assemblies which
  have a means of being depressed/compressed with fingers, as a result of how they are retained at the central pin assembly housing member, and sprung at the outer housing members.
  protrude through and beyond the end pin assembly housing members, with the protruding ends are angled in order to achieve smooth connection with receiving unit, which presses the pin assembly in upon frame expansion.
  have a spring and retaining screw used in conjunction with the end pin assembly housing members to achieve the spring-loaded operation.

Pin receiving units
  a hole or threaded insert in a separate member that requires position locking In other embodiments, an internal gearing system for multi-wheel assemblies comprises one of more of the following components (and/or components in other claim sets) in any combination:

A central sun gear, attached to and driven by a spinning axle.
  axle is retained with flange bearings mounted to the multi-wheel assembly housing.

Planetary gear train sets (as many sets as there are wheels in the multi-wheel assembly)
  2+ of similar or dissimilar gears,
    positioned in a line along the "rays" of the multi-wheel assembly
    transferring energy from sun, out to each wheel.
  Gear size keeps within the housing of multi-wheel assembly, observing existing requirements for clearance and engagement with existing stair types.
    allows housing to be fortified for safety
  Housing used as planetary carrier/arm—Gears mount directly to multi-wheel assembly housing.
  Gears added to the multi-wheel
    Receives energy from gears
    Could be geared wheel (on the tread), or gear sitting beside the hub on the wheel.
  The larger this wheel, the greater speed reduction from the sun gear In other embodiments, an embedded suspension solution for multi-wheel assemblies (with even wheel count) comprises one of more of the following components (and/or components in other claim sets) in any combination:

A split housing
  The existing even-wheel-count multi-wheel assembly housing is symmetrically split in such a way as to retain only a wheel set (diagonal across the longest sides) from each occurrence The remainder of the existing even-wheel-count multi-wheel assembly
  Wheels, Bearings, Nuts, Bolts, Washers.

Spring Posts
  2× protruding out from housing unit in same direction as bolts, an equal distance from the hub/axle
  Are as close to the axle as possible, while providing the clearance/suspension swing required
  Once solution is assembled, spring posts create pattern the same as the outer wheel pattern and point outward on each side.

Springs
  Provide clearance when not needed, and expansion when needed

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A hand-truck frame system comprising:
    a main frame having a top portion and a bottom portion;
    a main handle coupled to the main frame with a first movable joint member adjacent the top portion;
    a bed frame having a first side, a second side, a rear portion and a front portion, the rear portion being coupled to the main frame with a second movable joint member adjacent the bottom portion;
    a first multi-wheel assembly coupled to a first side of the main frame at the bottom portion of the main frame, the first multi-wheel assembly being positioned outwardly from the first side of the bed frame;
    a second multi-wheel assembly coupled to a second side of the main frame, the first multi-wheel assembly being positioned outwardly from the second side of the bed frame;
    a front leg frame coupled to and extending downwardly from the front portion of the bed frame and comprising at least two wheels spaced apart and coupled to the front leg frame; and
    an extension leg frame coupled to the front leg frame with a third movable joint member,
    wherein, in use, the extension leg frame is movable from a first position in which the at least two wheels of the front leg frame engage with a ground surface and a second position in which the at least two wheels of the front leg frame are raised above the ground surface,
    wherein the bottom portion of the main frame extends below the bed frame.

2. The hand-truck frame system of claim 1, wherein the first and second multi-wheel assemblies each have four wheels radially mounted about respective hubs of the first and second multi-wheel assemblies.

3. The hand-truck frame system of claim 2, wherein the four wheels of a respective multi-wheel assembly are of the same size and mounted in a square pattern, each of the four wheels of the respective multi-wheel assembly being spaced from a center of the respective hubs by a first distance.

4. The hand-truck frame system of claim 3, wherein adjacent ones of the four wheels of the respective multi-wheel assemblies are spaced apart by the first distance as measured from their rotational axes.

5. The hand-truck frame system of claim 2, wherein the respective hubs have a central hub height, measured from a center of the hub to the ground, and
wherein the hub height is between 4 inches and 6 inches.

6. The hand-truck frame system of claim 2, wherein the respective hubs comprise a housing to which the four wheels are coupled, the housing comprise four concavely-curved sections between respective adjacent wheels.

7. The hand-truck frame system of claim 2, further comprising a suspension system configured to allow the center axes of the four wheels to move relative to each other.

8. The hand-truck frame system of claim 7, wherein the respective hubs comprise a housing with four arm members extending from a center axis of the hub to which the four wheels are coupled, and wherein the suspension system comprises a plurality of spring members extending between at least some of the four arm members.

9. The hand-truck frame system of claim 1, further comprising an extension handle coupled to the main handle with a fourth movable joint member,
wherein the extension handle is movable from a first position in which it extends downward and is aligned with the main handle to a second position in which the extension handle extends at least partially upward.

10. The hand-truck frame system of claim 9, wherein the extension handle moves 180 degrees between the first position and the second position.

11. The hand-truck frame system of claim 1, wherein the second movable joint member couples the bed frame to the main frame at a height that is between 15-33% greater than a height of the first and second multi-wheel assembly.

12. The hand-truck frame system of claim 1, wherein the main frame, the main handle, the bed frame, the front leg frame, and the extension leg frame can be collapsed so that all are generally collinearly arranged.

13. The hand-truck frame system of claim 1, wherein, in the second position, the extension leg frame positions the bed frame so that a plane of the bed frame, relative to a flat ground surface, is at an angle of between 0 and 15 degrees.

14. The hand-truck frame system of claim 1, wherein the bed frame includes a rectangular-shaped frame.

15. The hand-truck frame system of claim 1, wherein each of the first, second, and third movable joint members are movable about a range of motion, respectively, and the hand-truck frame system further comprises a plurality of spring-loaded locking mechanisms that lock in at least two positions within the respective ranges of motion of the first, second, and third movable joint members.

16. A hand-truck frame system comprising:
a main frame having a top portion and a bottom portion;
a bed frame having a rear portion and a front portion, the rear portion being coupled to the main frame with a first movable joint member adjacent the bottom portion, the bed frame being movable relative to the main frame between a first position and a second position, the first position being a collapsed position where the bed frame and the main frame are collinearly aligned and the second position being an operable position where the bed frame and the main frame are at a 90 degree angle to one another;
a left four-wheel assembly coupled to a left side of the main frame at the bottom portion of the main frame, the left four-wheel assembly being positioned outwardly from a left side of the bed frame;
a right four-wheel assembly coupled to a right side of the main frame at the bottom portion of the main frame, the right four-wheel assembly being positioned outwardly from a right side of the bed frame;
a front leg frame coupled to and extending downwardly from the front portion of the bed frame and comprising at least two wheels spaced apart and coupled to the front leg frame, the front leg frame coupled to the bed frame with a second movable joint, the front leg frame being movable relative to the bed frame between a first position and a second position, the first position being a collapsed position where the front leg frame and the bed frame are collinearly aligned and the second position being an operable position where the front leg frame and the bed frame are at a 90 degree angle to one another; and
an extension leg frame coupled to the front leg frame with a third movable joint member, the extension leg frame being movable from a first position in which the at least two wheels of the front leg frame engage with a ground surface and a second position in which the at least two wheels of the front leg frame are raised above the ground surface, wherein in the second position the bed frame is positioned at an angle greater than 0 degrees relative to the ground surface,
wherein the bottom portion of the main frame extends below the bed frame.

17. The hand-truck frame system of claim 16, wherein the left and right four-wheel assemblies are radially mounted about respective hubs, and
wherein the four wheels of each of the left and right four-wheel assemblies are mounted in a square pattern with each of the four wheels of the respective left and right four-wheel assemblies being spaced from a center of the respective hubs by a first distance.

18. The hand-truck frame system of claim 16, further comprising:
a main handle pivotably coupled to the main frame;
an extension handle pivotably coupled to the main handle; and
a plurality of locking mechanisms,
wherein the main handle and the extension handle are movable between positions in which they are collinearly aligned and positions in which they are not collinearly aligned, and the plurality of locking mechanisms can secure the main handle and extension handle in at least two different positions relative to each other.

19. The hand-truck frame system of claim 16, wherein the bed frame is coupled to the main frame at a height that is between 15-33% greater than a height of the left and right four-wheel assemblies.

20. The hand-truck frame system of claim 16, wherein, in the second position, the extension leg frame positions the bed frame so that a plane of the bed frame, relative to a flat ground surface, is at an angle of between 5 and 15 degrees.

* * * * *